US009581705B2

(12) United States Patent
Chelminski

(10) Patent No.: US 9,581,705 B2
(45) Date of Patent: Feb. 28, 2017

(54) SYSTEM AND METHOD FOR PRODUCING HIGH QUALITY SEISMIC RECORDS WITHIN BORE HOLES

(71) Applicant: Stephen Chelminski, Antrim, NH (US)

(72) Inventor: Stephen Chelminski, Antrim, NH (US)

( * ) Notice: Subject to any disclaimer, the term of this patent is extended or adjusted under 35 U.S.C. 154(b) by 0 days.

(21) Appl. No.: 14/560,482

(22) Filed: Dec. 4, 2014

(65) Prior Publication Data

US 2015/0083519 A1 Mar. 26, 2015

Related U.S. Application Data

(63) Continuation-in-part of application No. 14/052,731, filed on Oct. 12, 2013, now Pat. No. 8,931,587.

(60) Provisional application No. 61/713,945, filed on Oct. 15, 2012, provisional application No. 61/987,081, filed on May 1, 2014.

(51) Int. Cl.
| | |
|---|---|
| *G01V 1/40* | (2006.01) |
| *G01V 1/46* | (2006.01) |
| *E21B 47/06* | (2012.01) |
| *G01V 1/147* | (2006.01) |
| *G01V 1/28* | (2006.01) |
| *E21B 47/00* | (2012.01) |

(52) U.S. Cl.
CPC ............... *G01V 1/147* (2013.01); *G01V 1/40* (2013.01)

(58) Field of Classification Search
CPC ... G01V 1/40; G01V 1/46; G01V 1/52; E21B 47/06
USPC ............................................ 181/105; 367/35
See application file for complete search history.

(56) References Cited

U.S. PATENT DOCUMENTS

| | | | |
|---|---|---|---|
| 3,310,128 A * | 3/1967 | Chelminski | G01V 1/047 181/114 |
| 4,577,547 A | 3/1986 | Jaworski | |
| 4,858,718 A * | 8/1989 | Chelminski | E21B 47/011 181/106 |
| 4,862,990 A | 9/1989 | Cole | |
| 4,928,783 A | 5/1990 | Crook | |
| 4,939,704 A | 7/1990 | Chelminski | |
| 4,971,160 A * | 11/1990 | Upchurch | E21B 41/00 166/297 |
| 4,991,685 A | 2/1991 | Airhart | |
| 5,010,527 A * | 4/1991 | Mahrer | E21B 43/26 166/254.2 |
| 5,031,163 A * | 7/1991 | Holzhausen | G01V 1/50 181/105 |
| H001156 H * | 3/1993 | Siegfried, II | G01V 1/50 181/102 |
| 5,273,113 A * | 12/1993 | Schultz | E21B 34/16 166/374 |

(Continued)

OTHER PUBLICATIONS

European Search Report App. No. 13847095.0 issued Jun. 16, 2016.

*Primary Examiner* — Edgardo San Martin
(74) *Attorney, Agent, or Firm* — ZIP Law PLLC; Claire Zopf

(57) ABSTRACT

A sound source for geophysical studies of the earth for oil, gas and other natural resource exploration and more specifically a streamlined design of a hydraulically controlled impulsive sound source that may be inserted into oil wells and bore holes and a system and method for obtaining high quality seismic records from the impulsive sound source by adjusting and maintaining pressures within the well or bore hole.

16 Claims, 14 Drawing Sheets

(56) References Cited

U.S. PATENT DOCUMENTS

| | | | | |
|---|---|---|---|---|
| 5,318,130 | A | * | 6/1994 | Manke .................... E21B 23/04 |
| | | | | 166/321 |
| 5,941,307 | A | * | 8/1999 | Tubel .................... E21B 34/066 |
| | | | | 166/313 |
| 6,173,803 | B1 | | 1/2001 | Barger |
| 7,322,410 | B2 | * | 1/2008 | Vinegar .............. E21B 33/1294 |
| | | | | 166/250.15 |
| 2002/0020533 | A1 | * | 2/2002 | Tubel .................... E21B 34/066 |
| | | | | 166/313 |
| 2008/0105426 | A1 | * | 5/2008 | Di ........................... G01V 1/40 |
| | | | | 166/250.02 |

* cited by examiner

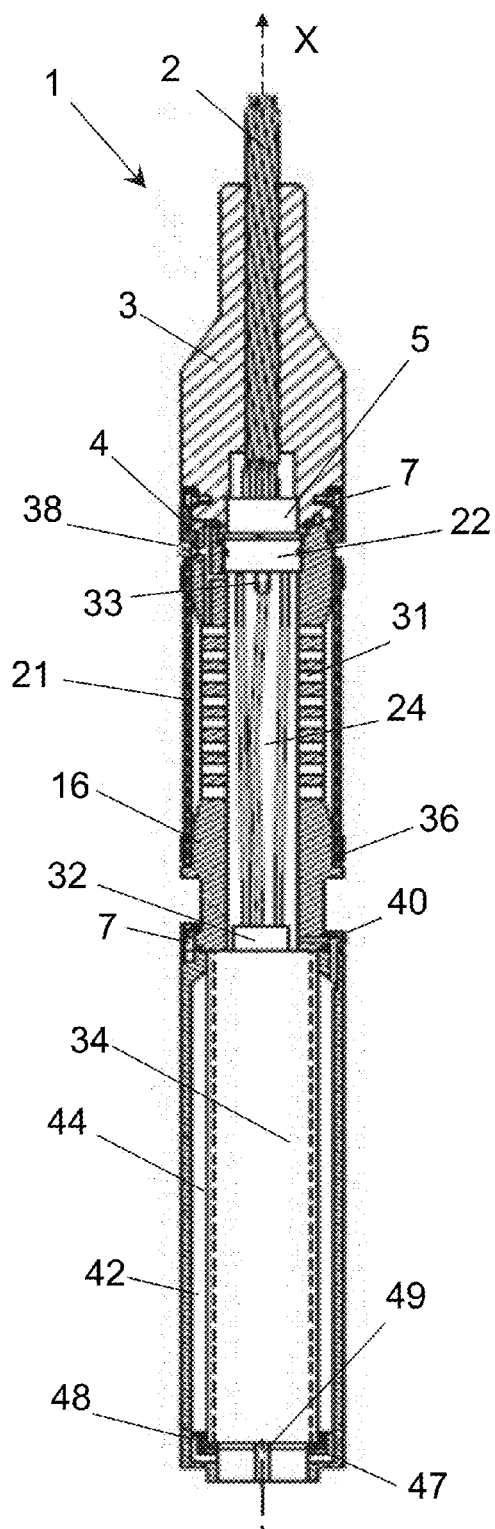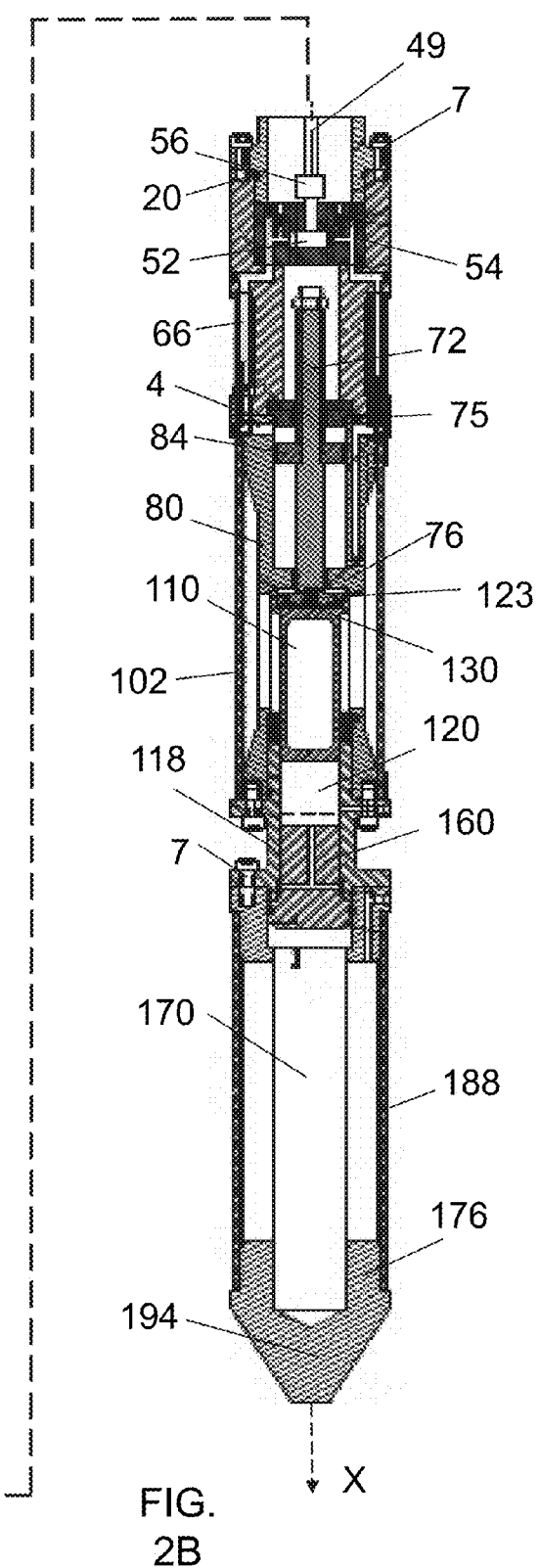
FIG. 2A
FIG. 2B

MODULE A

MODULE B

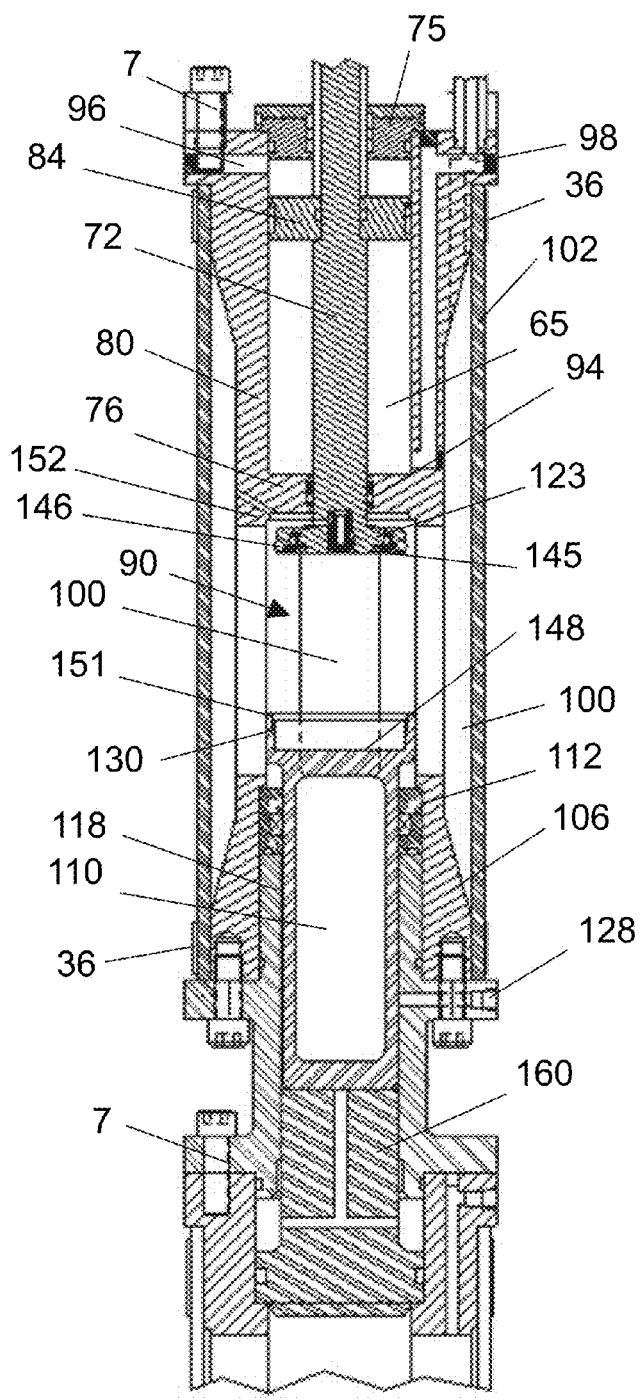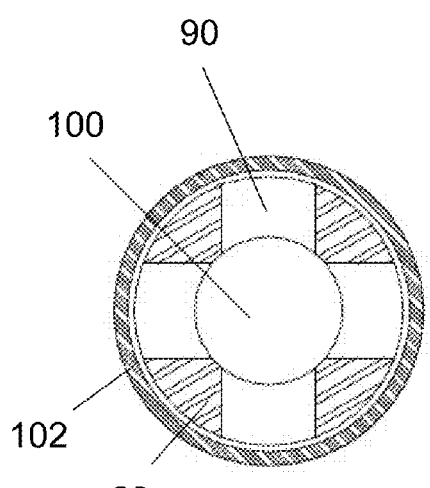
FIG. 7C
FIG. 7B

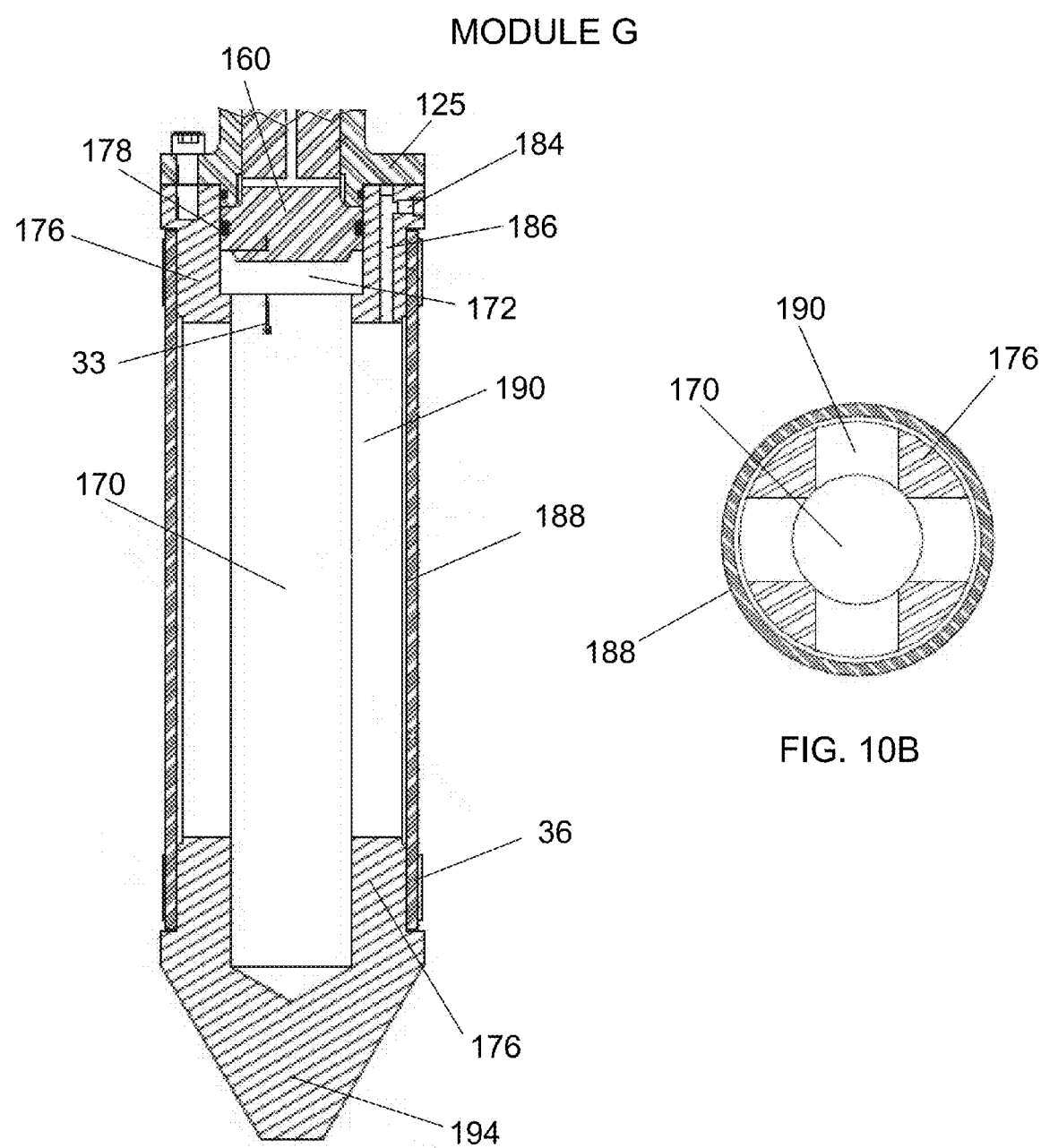

SYSTEM AND METHOD FOR PRODUCING HIGH QUALITY SEISMIC RECORDS WITHIN BORE HOLES

RELATED APPLICATIONS

This application is a continuation-in-part of U.S. patent application Ser. No. 14/052,731 filed Oct. 12, 2013 that claims the benefit of U.S. Provisional Application No. 61/713,945 filed Oct. 15, 2012 entitled Method and Apparatus for Producing Sound Pulses within Bore Holes which is incorporated herein by reference in its entirety. This application further claims the benefit of U.S. Provisional Application No. 61/987,081 filed May 1, 2014 entitled, System and Method for Energizing an Impulsive Type Down-Hole Source which are each incorporated herein by reference in their entireties.

FIELD OF THE INVENTION

The present invention is related to a system and method for obtaining high quality seismic records from an impulse type sound source for geophysical studies of geological structures surrounding bore holes. The present invention is further related to a system and method of artificially pressurizing the bore hole and to adjusting and maintaining pressures within the bore hole to obtain sufficient sound output levels and high quality seismic records.

BACKGROUND OF THE INVENTION

Geophysical surveys provide a cross-sectional map of the geology below the surface of the earth. Using sound waves, the shape and character of the geology may be revealed to indicate pockets within the sedimentary layers where oil and gas may be trapped, indicating locations where exploratory wells may be drilled for further geological analysis. Geophysical studies between bore holes or between bore holes and the ground surface have been done in the past using small charges of explosive impulsive sources and vibratory sound sources, but none of these types of sound sources have proved to be either practical or robust enough to be used over extended periods of time.

SUMMARY OF THE INVENTION

A system and method of providing high quality seismic records from an impulse type of down-hole sound source designed to be robust as well as provide a practical tool to provide sound pulses for geophysical studies of the earth surrounding bore holes is here-with provided. The present invention further provides a system and method of obtaining seismic records using an impulsive sound source within a bore hole comprising the steps of artificially pressurizing the bore hole to obtain acceptable high quality seismic records. The present invention utilizes a free piston which is accelerated by the hydrostatic pressure of a fluid. Upon actuation of the free piston, the free piston moves through an isolated partially fluid filled piston chamber and strikes a sound transmitting anvil sending a sound pulse into an adjacent sound transmission chamber that is filled with light weight oil and surrounded by an elastomeric bladder. The sound pulse from the accelerating anvil moves the elastomeric bladder producing a sound wave that is emitted out through the fluid and ambient walls of the bore hole and into geological surrounding structures. In preparation for firing, an electric motor powered hydraulic pump, pumps hydraulic fluid to move a reset piston assembly to position a latching seal flange of the assembly into a receiving cup of a free piston. A check valve assembly within the flange provides for the evacuation of fluid within the receiving cup forming a vacuum seal that allows the reset piston assembly to draw the free piston through a high pressure fluid filled chamber and into a ready to fire position. The free piston is drawn to a stop point that breaks the vacuum and allows high pressure fluid within the chamber to rapidly accelerate the free piston against the anvil piston with the impulse providing the sound transmission.

The impulsive sound source is designed in sections aligned end to end with a first cable termination module housing an umbilical cable and providing for the cable to be attached to and detached from the source. The cable is terminated at a two piece connector that has a first half portion within the upper module detachable from a second half portion that is mounted within the next module, an expansion chamber. The expansion chamber is enclosed with an elastomeric bladder to provide for changes in pressures within the source and assist in the absorption of vibrations as the source is fired. The expansion chamber serves as a reservoir for hydraulic fluid to operate the reset piston assembly. The expansion chamber also houses a set of power cables that extend through the chamber and are affixed to run an electric motor housed in the next module. The electric motor drives a hydraulic pump housed within a next module. The hydraulic pump takes fluid from and returns fluid to the reservoir of the expansion chamber and provides fluid to move the reset piston assembly that prepares the source for firing. The reset piston assembly module also houses the high pressure fluid implosion chamber for the free piston. The impact chamber is an open cylinder that houses the anvil and receives the fired free piston from the implosion chamber that strikes the anvil forcing the anvil a short distance into the sound transmission chamber transmitting the sound pulse to the elastomeric bladder that encloses the transmission chamber. The bladder propagates the sound through the fluid of the bore hole and the surrounding geological structure.

The reversible three phase or DC motor is capable of high temperature operation and provides for the source to be successively fired as the motor is rotated in a first direction to supply hydraulic fluid to move the reset piston down to retrieve the free piston and an opposite direction to draw the free piston up to a ready to fire position with the rate of firing controlled by the speed of the motor. The motor direction is reversed using a relay switch that switches the power leads when the motor amperage peaks due to the latching seal flange bottoming out within the receiving cup in an extended position of the reset piston assembly or to switch directions when abutting a bulkhead of the reset piston assembly housing in a fully retracted position. In further embodiments, the electric motor may be controlled remotely to set the speed of the motor and firing rate.

The modular design of the impulsive sound source provides for the top surface of the anvil and bottom surface of the free piston cylinder to be interchanged with anvils and free pistons of different shapes and sizes to change the characteristics of the sound pulse and seismic data. By varying the weight and/or stroke of the free piston and/or the anvil shape or other characteristics, the output pulse may be varied or tuned. For example, two flat shapes of the piston and anvil surfaces may produce the sharpest energy transition with the greatest amplitude and highest frequency upon impact of the free piston and the anvil piston. However, if the free piston shape is instead shaped as a conical point mating with the anvil having a conical hole, the frequency content would change as the conical point enters the conical hole producing a longer pulse with lower frequency content in the sound pulse with various shapes producing a range of amplitudes and frequencies.

The impact chamber is further partially filled with fluid to create a cushion for the free piston and the anvil preventing the contact of metal on metal and absorbing vibrations within the source. The sound characteristics may be further changed by the compressibility and type of fluid used within the impact chamber. Fluids of different viscosity and compressibility may change compression characteristics of the fluid. For example, a more compressible fluid may slow the acceleration of the free piston and therefore produce a lower frequency pulse. The impulsive sound source may further be of any diameter and length necessary to accommodate the diameter of the bore hole and requirements of the geological survey.

The present invention is further related to an impulsive sound source comprising an umbilical cable extending through a cylindrical housing; a hydraulic fluid reservoir formed within the housing and supplying a hydraulic pump; an electric motor powered from the umbilical cable and controlling the hydraulic pump; a hydraulic cylinder controlled by the hydraulic pump; a reset piston movable within a fluid filled piston chamber using the hydraulic cylinder, the reset piston having a flange movable within an implosion chamber; a free piston having an annular rim and cup within the implosion chamber; an anvil within an impact chamber adjacent the implosion chamber; an elastomeric bladder enclosing a fluid filled sound transmission chamber adjacent the impact chamber; and wherein the free piston is accelerated by hydrostatic pressure within the implosion chamber to strike the anvil and transmit a sound pulse through the sound transmission chamber and the elastomeric bladder.

The impulsive sound source further comprises a latching seal assembly surrounding the reset piston flange, the flange having an inlet passage and check valve to evacuate fluid from the free piston cup and thereby latch the reset piston and free piston to draw the free piston to a ready to fire position. The difference in cross-sectional area of the reset piston flange and free piston annular rim provides the clamping force for the reset piston to latch to the free piston. The impulsive sound source may be repeatably fired by having the reset piston retract to an uppermost position causing the electric motor to rotate in a first direction to control the delivery of hydraulic fluid from the hydraulic pump to a first chamber and return hydraulic fluid to the reservoir from a second chamber and move the reset piston to the free piston and wherein the reset piston and free piston latch triggering the electric motor to reverse direction and the delivery of hydraulic fluid from the hydraulic pump is to the second chamber and return of hydraulic fluid to the reservoir is from the first chamber to move the reset piston and free piston to the uppermost position where the free piston is fired and the electric motor is triggered to rotate in the first direction.

The impact chamber of the impulsive sound source may be partially filled with fluid and changing the viscosity and compressibility of the fluid within the impact chamber changes the characteristics of the sound pulse. In the impulsive sound source, the shape of a bottom surface of the free piston and the shape of the top surface of the anvil changes the characteristics of the sound pulse where as an example the top surface of the anvil may be recessed in shape and the shape of the free piston may be conical. The impulsive sound source may further have a dashpot in the anvil. The implosion chamber of the impulsive sound source may further comprise an elastomeric bladder to conform to fluid movements within the impulsive sound source. The reservoir of the impulsive sound source may further comprise an elastomeric bladder to conform to fluid movements within the impulsive sound source. Components of the impulsive sound source may be arranged in the order of an umbilical termination module on the top, an expansion chamber module beneath, next an electric motor housing module beneath, next a hydraulic pump module beneath, next an hydraulic cylinder module beneath, next a free piston implosion module beneath, next an impact chamber module beneath, and next a sound transmitting module beneath.

The impulsive sound source may further comprise a manifold block adjacent to the hydraulic pump and the manifold block may house two pressure relief valves and two check valves. The reset piston of the impulsive sound source may be directly attached to a hydraulic piston rod on the opposite side of a hydraulic cylinder bulkhead. The sound transmitting anvil of the impulsive sound source may have fluid flow passages for fluid volume control.

The present invention is further related to a method of generating a sound pulse within a bore hole through a manual or automated process, comprising the steps of extending an umbilical cable to support a cylindrical housing of a sound source; storing hydraulic fluid in a reservoir within the housing; supplying a hydraulic pump from the reservoir; controlling the hydraulic pump using an electric motor powered from the umbilical cable; filling a hydraulic cylinder using the hydraulic pump; moving a reset piston within a fluid filled implosion chamber using the hydraulic cylinder; seating the reset piston within a cup formed in the upper portion of a free piston; evacuating fluid from the cup forming a vacuum to draw the free piston using the reset piston to a ready to fire position; preventing travel of the free piston and pulling the reset piston from the cup thereby breaking the vacuum and accelerating the free piston to strike an anvil within an impact chamber to generate a sound pulse; transmitting the sound pulse through a fluid filled sound transmission chamber to an elastomeric bladder to propagate the pulse out and through the fluid filled bore hole and into the surrounding geological structures.

The method of generating a sound pulse within a bore hole may further comprise the steps of changing the viscosity and compressibility of fluid within the impact chamber to change the characteristics of the sound pulse. The method of generating a sound pulse within a bore hole may also further comprise the steps of increasing or decreasing the weight of the free piston to change the characteristics of the sound pulse. The method of generating a sound pulse within a bore hole may also further comprise the steps of increasing or decreasing the length of the stroke of the free piston to change the characteristics of the sound pulse. The method of generating a sound pulse within a bore hole may also further comprise the step of shaping a top surface of the anvil and the bottom surface of the free piston in reciprocal shapes to change the characteristics of the sound pulse. The method of generating a sound pulse within a bore hole may also further comprise the steps of shaping the top surface of the anvil to be a recessed cone and shaping the bottom surface of the free piston to be conical in shape to change the characteristics of the sound pulse. The method of generating a sound pulse within a bore hole may also further comprise the steps of transmitting a sound pulse wherein the free piston and anvil having flat surfaces; and collecting geological survey data; transmitting a sound pulse wherein the free piston having a conical shape and the anvil having a recess; collecting geological survey data; and combining the geological survey data acquired.

The method of generating a sound pulse within a bore hole may also further comprise the step of forming a dashpot in the anvil. The method of generating a sound pulse within a bore hole may also further comprise the step of enclosing the implosion chamber with an elastomeric bladder. The method of generating a sound pulse within a bore hole may also further comprise the step of enclosing the reservoir with an elastomeric bladder to form an expansion chamber. The method of generating a sound pulse within a bore hole may also further comprise the step forming the free piston with an annular rim.

The present invention is further related to a system and method of obtaining acceptable high quality seismic records by adjusting and maintaining pressures within a bore hole that may be similar to initial pressures from the first acquisition data in the survey or to desired pressures based on the fluid of the bore hole or the intensity and characteristics of the recorded seismic data. In performing a seismic survey, the impulsive sound source may be lowered to a position within a bore hole and fired to acquire the seismic records. The impulsive sound source may then be moved set distances and fired to acquire seismic data within the prescribed region of the survey. Each time the impulsive sound source is moved, pressures surrounding the source change resulting in changes to the intensity and characteristics of the seismic data.

The present invention is related to a method of obtaining seismic records using an impulsive sound source within a bore hole comprising the steps of lowering an impulsive sound source to a desired depth within a bore hole to begin a seismic survey; measuring pressure readings within the bore hole to determine an initial pressure; adjusting the supply of gas or fluid to the bore hole to adjust the pressure within the bore hole based on the initial pressure and current pressure readings; firing the impulsive sound source; and acquiring seismic records. The method of obtaining seismic records using an impulsive sound source within a bore hole further comprising the step of adjusting the pressure within the bore hole to the initial pressure. The method is further related to the steps of determining the intensity and characteristics of the seismic records. The method further comprises the steps of adjusting the supply of gas or fluid to the bore hole to adjust the pressure within the bore hole based on the determined intensity and characteristics of the seismic records.

The method further comprises the steps of raising the impulsive sound source to a new depth within the bore hole; measuring pressure readings within the bore hole at the new depth; adjusting the supply of gas or fluid to the bore hole to adjust the pressure within the bore hole to the initial pressure readings. The method further comprises the steps of raising the impulsive sound source to a new depth within the bore hole; measuring pressure readings within the bore hole at the new depth; adjusting the supply of gas or fluid to the bore hole to adjust the pressure within the bore hole to a desired pressure based on the initial and current pressure readings. The method further comprises the steps of moving the impulsive sound source to another depth within the bore hole; measuring pressure readings within the bore hole; firing the impulsive sound source within the bore hole; determining the intensity and character of the seismic records; adjusting the supply of gas or fluid to the bore hole to adjust the pressure within the bore hole based on the initial and current pressure readings and the intensity and characteristics of the seismic records. The method further comprises the steps of simultaneously moving the impulsive sound source while firing the impulsive sound source within the bore hole while measuring pressure readings within the bore hole while determining the intensity and characteristics of the seismic records and adjusting the supply of gas or fluid to the bore hole to adjust the pressure within the bore hole based on the initial and current pressure readings and the intensity and characteristics of the seismic records.

The present invention is further related to a method of obtaining seismic records using an impulsive sound source within a bore hole comprising the steps of artificially pressurizing the bore hole to obtain enough pressure to operate the sound source to sufficient sound output levels to obtain acceptable high quality seismic records. In the method, the pressure levels are changed within the bore hole as the sound source is moved within the bore hole in order to adjust the pressure within the bore hole to a desired level. The present invention is further related to a method of moving an impulsive sound source up or down within a fluid filled bore hole, adjusting pressures within the bore hole and firing the source at a constant fluid pressure surrounding the source.

The present invention is further related to a system for adjusting and maintaining pressure within a bore hole in order to obtain consistent quality seismic records using an impulsive sound source comprising an impulsive sound source; an umbilical cable for lowering the impulsive sound source to a desired depth within a bore hole to begin a seismic survey; a pressure sensor measuring readings within the bore hole; a gas or fluid pressure source; a pressure regulator adjusting the supply from the pressure source of gas or fluid to the bore hole to adjust the pressure within the bore hole based on an initial and current pressure readings; a controller for firing the impulsive sound source. The system for adjusting and maintaining pressure within a bore hole in order to obtain acceptable quality seismic records wherein the initial pressure is a pressure reading taken at an initial depth at the beginning of a seismic survey. The system for adjusting and maintaining pressure within a bore hole in order to obtain acceptable quality seismic records further comprises a computer processor for determining the intensity and characteristics of the seismic records from the firing of the impulsive source. In using the system for adjusting and maintaining pressure within a bore hole in order to obtain acceptable quality seismic records using an impulsive sound source, the adjustment of gas and/or fluid from the pressure source using the pressure regulator may be based on the determined intensity and characteristics of the seismic records. The impulsive sound source may then be moved to a new depth within the bore hole using the umbilical cable of the pressure source and using the pressure regulator of the system the supply of gas or fluid to the bore hole may be adjusted to the initial pressure or to a desired pressure at the new depth. Using the computer processor, the system for maintaining pressure within a bore hole in order to obtain acceptable quality seismic records using an impulsive sound source, the pressure regulator may adjust the supply of gas or fluid to the bore hole to the initial pressure or a desired pressure simultaneously while the impulsive sound source is moving and firing based on the initial and current pressure readings and the intensity and characteristics of the seismic records. The pressure within the bore hole may be adjusted automatically using the computer processor or by using a manually controlled pressure regulator or a manually operated fluid control valve.

The present invention is related to an impulsive sound source for obtaining seismic records within a bore hole, comprising a hydraulic pump; a reset piston; a free piston; a movable anvil; and wherein the free piston is accelerated by hydrostatic pressure to strike the movable anvil and transmit a sound pulse through a bore hole to obtain seismic records. The impulsive sound source may comprise an umbilical cable. The impulsive sound source may comprise a hydraulic fluid reservoir. The impulsive sound source may comprise at least one elastomeric bladder. The free piston of the impulsive sound source may have an annular rim and cup. The reset piston may have a latching seal and check valves to expel fluid from the free piston cup to latch the reset piston and free piston. The impulsive sound source may comprise an electric motor and may be repeatably fired by having the reset piston move to a retracted position causing the electric motor to rotate in a first direction to control the hydraulic pump to move the reset piston to the free piston; and the reset piston and the free piston latch triggering the electric motor to reverse direction and move the reset piston and free piston to the retracted position to fire the free piston and trigger the electric motor to rotate in the first direction. The characteristics of the sound pulse of the impulsive sound source may be changed by changing the weight of the free piston. The characteristics of the sound pulse of the impulsive sound source may be changed by changing the stroke of the free piston.

The present invention is further related to an impulsive sound source, comprising an impulsive sound source comprising modules, the modules comprising an umbilical termination module; an expansion chamber module; an electric motor housing module; a hydraulic pump module; a hydraulic cylinder module; a free piston implosion module; an impact chamber module; and a sound transmitting module.

The components of the impulsive sound source are arranged in the order of the umbilical termination module on the top, the expansion chamber module beneath, next the electric motor housing module beneath, next the hydraulic pump module beneath, next the hydraulic cylinder module beneath, next the free piston implosion module beneath, next the impact chamber module beneath, and next the sound transmitting module beneath.

The present invention is further directed to a method of obtaining seismic records within a bore hole, comprising the steps of delivering hydraulic fluid to move a reset piston to a free piston; latching the reset piston to the free piston; moving the reset piston and free piston to a ready to fire position; accelerating the free piston using hydrostatic pressure to strike a movable anvil to generate a sound pulse; transmitting the sound pulse through a bore hole to obtain seismic records. The method of obtaining seismic records within a bore hole comprising the steps of repeatedly firing the sound source comprising the steps of controlling the delivery of hydraulic fluid using an electric motor; moving the reset piston to a retracted position causing the electric motor to rotate in a first direction to deliver hydraulic fluid to move the reset piston to the free piston; latching the reset piston to the free piston causing the electric motor to reverse direction to deliver hydraulic fluid to move the reset piston and free piston to the retracted position to fire the free piston and trigger the electric motor to rotate in the first direction.

The present invention is further related to a method of obtaining seismic records using an impulsive sound source within a bore hole comprising the steps of moving an impulsive sound source within a bore hole; adjusting pressures within the bore hole; firing the impulsive sound at an adjusted pressure surrounding the impulsive sound source; and acquiring seismic records. The method of obtaining seismic records using an impulsive sound source within a bore hole may further comprise the steps of measuring pressure readings within the bore hole at the a first depth to obtain an initial pressure; moving the impulsive sound source to a new depth within the bore hole; measuring pressure readings within the bore hole at the new depth; adjusting pressure within the bore hole to the initial pressure. The method of obtaining seismic records using an impulsive sound source within a bore hole may further comprise the steps of moving the impulsive sound source to a new depth within the bore hole; measuring pressure readings within the bore hole at the new depth; adjusting pressure within the bore hole to a desired pressure. The method of obtaining seismic records using an impulsive sound source within a bore hole may further comprise the steps of determining the intensity and characteristics of the seismic records. The method of obtaining seismic records using an impulsive sound source within a bore hole may further comprise the steps of adjusting the pressure within the bore hole based on a determined intensity and characteristics of the seismic records. The method of obtaining seismic records using an impulsive sound source within a bore hole may further comprising the steps of moving the impulsive sound source to another depth within the bore hole; measuring pressure readings within the bore hole; firing the impulsive sound source within the bore hole; determining the intensity and characteristics of the seismic records; adjusting the pressure within the bore hole based on pressure readings and the intensity and characteristics of the seismic records. The method of obtaining seismic records using an impulsive sound source within a bore hole may comprise the steps of simultaneously moving the impulsive sound source while firing the impulsive sound source within the bore hole while measuring pressure readings within the bore hole while determining the intensity and characteristics of the seismic records; and adjusting the pressure within the bore hole based on the pressure readings and the intensity and characteristics of the seismic records. The method of obtaining seismic records using an impulsive sound source within a bore hole may comprise the steps of artificially pressurizing the bore hole to obtain enough pressure to operate the impulsive sound source to sufficient sound output levels to obtain consistent quality seismic records. The pressure levels within the bore hole in the method of obtaining seismic records may be adjusted while the sound source is moving within the bore hole in order to keep the pressure within the bore hole at a desired level.

The present invention is further related to a system for adjusting and maintaining pressure within a bore hole in order to obtain acceptable quality seismic records using an impulsive sound source comprising an impulsive sound source having at least one pressure sensor; a pressure source; and wherein the pressure source adjusts the pressure within the bore hole based on initial and current pressure readings from the at least one pressure sensor. The initial pressure in the system may be a pressure reading taken at an initial depth at the beginning of a seismic survey and current pressure readings are pressure readings taken during the seismic survey. The system for adjusting and maintaining pressure within a bore hole in order to obtain acceptable quality seismic records using an impulsive sound source may further comprise a computer processor for determining the intensity and characteristics of the seismic records from the firing of the impulsive source. The adjustment of pressure within the bore hole may be based on a determined intensity and characteristics of the seismic records. The impulsive sound source may be moved to a new depth within the bore hole and the pressure source may adjust the pressure within the bore hole to the initial pressure at the new depth. The impulsive sound source may be moved to a new depth within the bore hole and the pressure source may adjust the pressure within the bore hole to a desired pressure at the new depth. In using the computer processor, the pressure source may adjust the pressure within the bore hole at the current depth of the impulsive sound source simultaneously while the impulsive sound source is moving and firing based on one of at least the initial and current pressure readings and the intensity and characteristics of the seismic records.

These and other features, advantages and improvements according to this invention will be better understood by reference to the following detailed description and accompanying drawings. While references may be made to upper, lower, vertical and horizontal, these terms are used merely to describe the relationship of components and not to limit the operation of the present invention to any one orientation.

BRIEF DESCRIPTION OF THE DRAWINGS

Several embodiments of the present invention will now be described by way of example only, with reference to the accompanying drawings in which:

FIG. 2A is a cross-sectional diagram of a first portion of the first embodiment of the impulsive sound source of the present invention;

FIG. 2B is a continuation of the cross-sectional diagram of FIG. 2A as a second portion of the first embodiment of the impulsive sound source of the present invention;

FIG. 7B is a cross sectional diagram of the embodiment of the reset piston assembly and free piston chamber of module E of the first embodiment of the impulsive sound source of the present invention in a fired position;

FIG. 7C is a cross sectional diagram of an embodiment of the reset piston assembly and free piston chamber of module E of the first embodiment of the impulsive sound source of the present invention in an extension of the reset piston assembly to prepare the source for firing;

FIG. 10A is a cross sectional diagram of an embodiment of a sound transmission chamber of module G of the first embodiment of the impulsive sound source of the present invention; and FIG. 10B is a top view cross section showing an embodiment of the communication ports in the sound transmission chamber of module G in a first embodiment of the impulsive sound source of the present invention;

DETAILED DESCRIPTION OF THE INVENTION

The present invention is an impulsive type sound source for creating sound pulses which can be used for seismic surveys between liquid filled bore holes in the ground such as water wells, oil wells and/or bore holes for geological studies. The present invention is further related to a system and method of artificially pressurizing the bore hole to obtain adequate and consistent pressures to operate the sound source to sufficient sound output levels to obtain acceptable high quality seismic records.

Figures 1A, 1B:
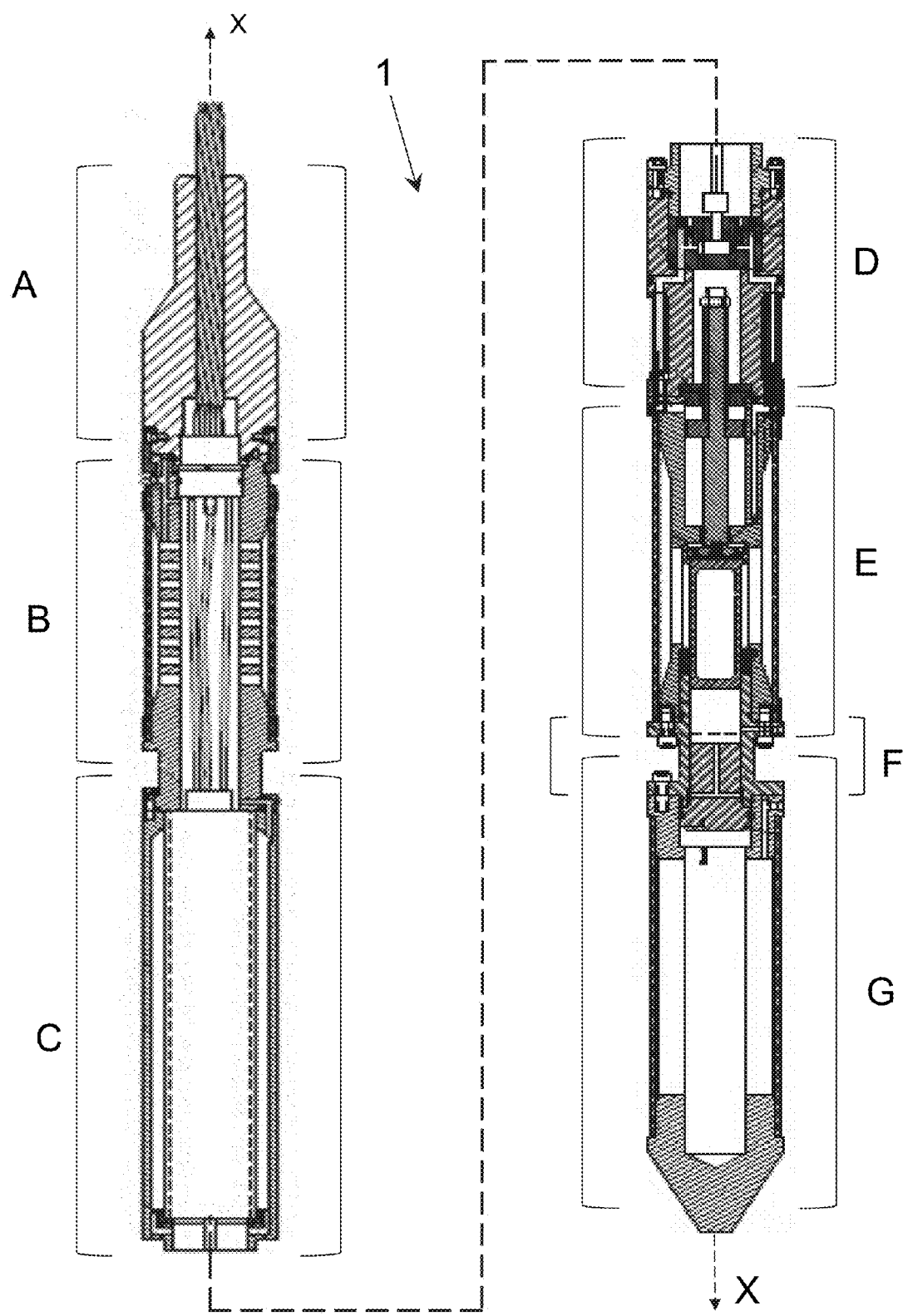
FIG. 1A is a cross-sectional diagram of a first portion of a first embodiment of the impulsive sound source in an embodiment of the present invention.
FIG. 1B is a continuation of the cross-sectional diagram of FIG. 1A as a second portion of a first embodiment of the impulsive sound source of the present invention.

The present invention provides a sleek modular design of an impulsive sound source 1 to make the system easier for transportation and insertion of the source into wells and bore holes for seismic analysis deep within the ground. The impulsive sound source 1 may be of any diameter and dimension suitable for the requirements of a geological survey with components of acceptable materials to withstand the high temperatures and pressures within water wells, oil wells and/or the bore holes used for geological studies. In a first embodiment, the impulsive sound source 1 is constructed with the series of modules as shown in FIGS. 1A and 1B with each of the modules A-G fixed end to end to one another along axis X using clamping rings and a series of bolt circles. Module A is the umbilical cable termination that as shown in FIGS. 2A and 2B has a housing 3 where the umbilical cable 2 aligns through the center of the housing and along axis X. The housing 3 may be of any shape, dimension or design with an upper termination head that is dependent on the size, design and construction of the umbilical cable 2. The umbilical cable 2 carries the weight of the source 1 as well as shields and surrounds the electric cables for power to the motor, and for electrical and/or optical cables for control and sensors as required within the source 1 such as sensors to determine the instant of firing, the pressure, the temperature and structural conditions within the source and within the bore hole.

Figure 3:
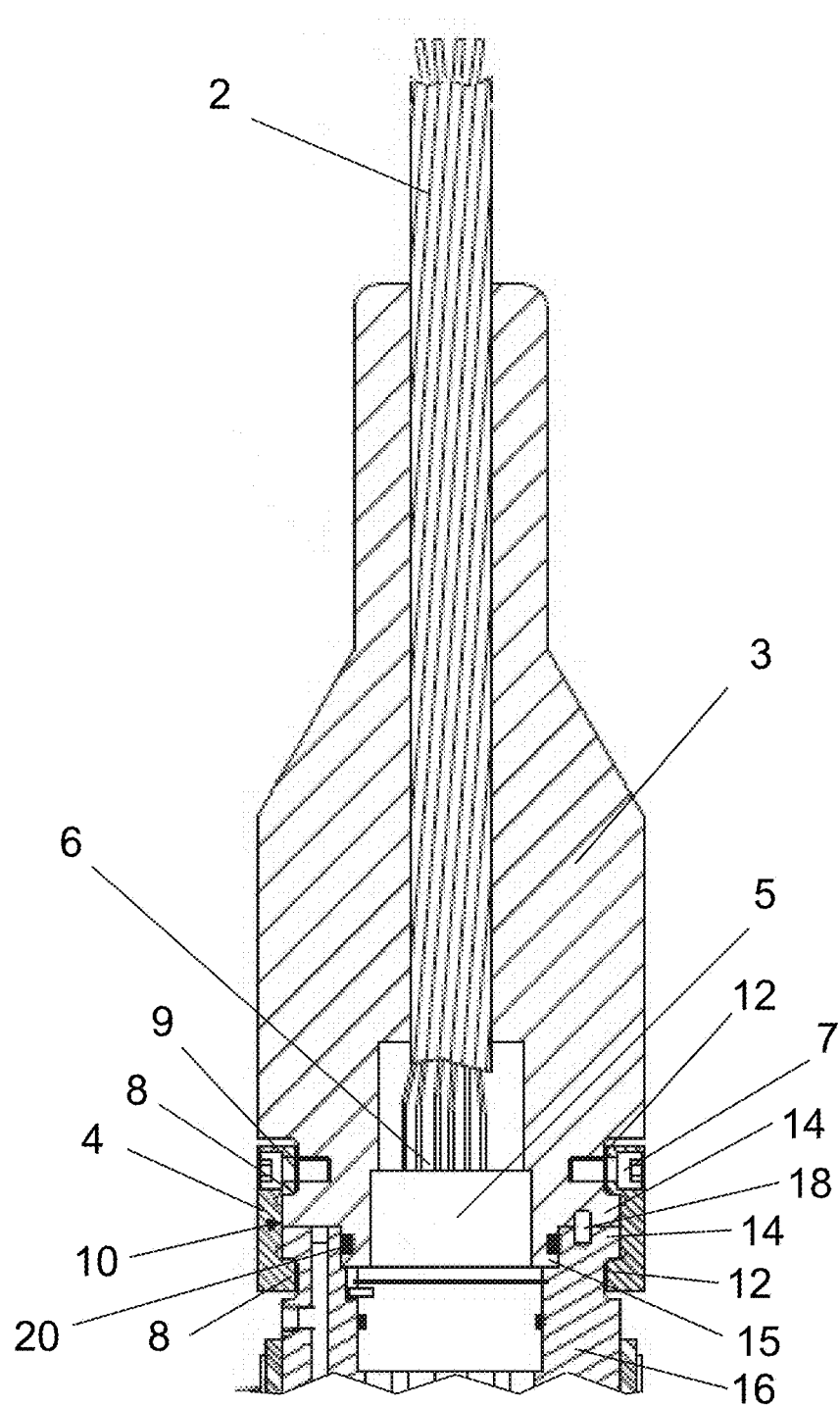
FIG. 3 is a cross sectional diagram of an embodiment of a cable termination of module A of the first embodiment of the impulsive sound source of the present invention.

As shown in FIG. 3, the connector 5 of module A provides a wire block 6 that distributes the electrical power, sensor and control cables throughout the source 1. Module A is attached to module B using a series of bolts 7 and a stainless steel clamping ring 4 positioned around the lower end of the cylindrical housing 3. Each of the upper and lower edges of the clamping ring 4 has a rim 8 extending completely around the ring 4 forming a channel 10 along a middle portion of the ring 4. The housing 3 and the rim 8 of the ring 4 may have a series of bolt holes 9 that are evenly spaced around the outer edge of the cylinder to accept the bolts 7 that secure the ring 4 to the housing 3. A groove 12 may be formed in the housing 3 to accept the rim 8 of the ring 4. The shoulder 14 forming the groove 12 may extend at a distance from axis X that is greater than a tubular center casing 15 that mates and aligns with the housing of module B. The tubular casing 15 formed on the base of the housing 3 is of a slightly smaller diameter than the diameter of the cylindrical housing 16 of module B. The housing 16 of module B, in this embodiment, is similarly formed with a shoulder 14 and groove 12 to provide for the lower rim 8 of the clamping ring 4 to lock around the shoulders 14 and secure the modules together. An index pin 18 may provide for the proper alignment and orientation of the modules with respect to one another. As described herein, heat resistant seal and bearing assemblies 20 made of viton or other plastic materials typically used in high pressure fluid applications are installed at the tubular casing 15 and at other connections in the housing and at each fluid path throughout the source to prevent leakage of hydraulic fluid and to properly secure and seal all high pressure connections.

Figure 4:
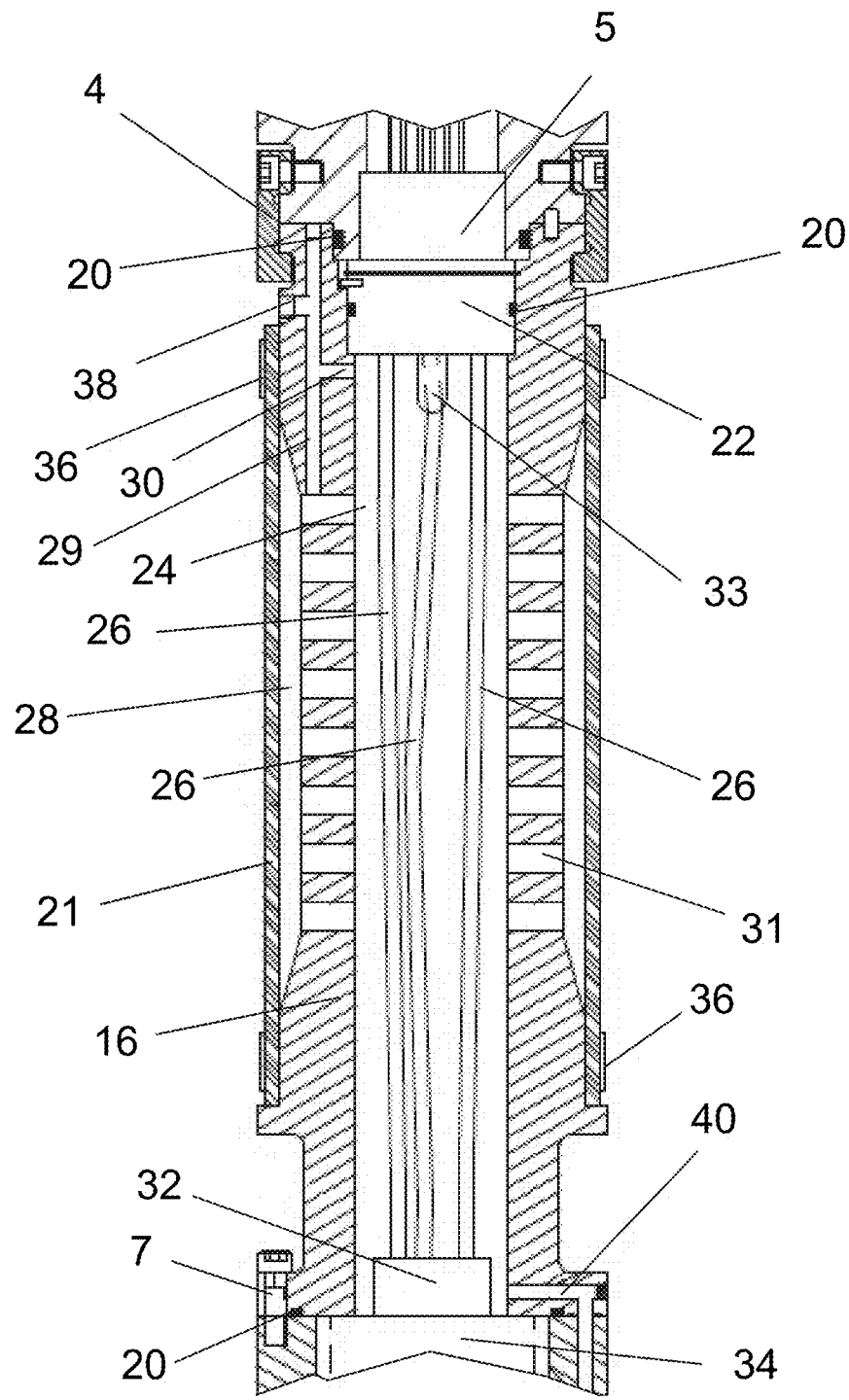
FIG. 4 is a cross sectional diagram of an embodiment of an expansion chamber of module B of the first embodiment of the impulsive sound source of the present invention.

Module B, as shown in FIG. 4, is an expansion chamber that is formed with a housing surrounded by an elastomeric bladder 21. The second half of the cable distribution connector 5 is a connector receptor 22 that is positioned at the top of the electric cable and fluid flow passage 24 that is formed through the center of the housing 16. The cable distribution connector 5 provides for the cable termination of module A to be disconnected from the rest of the impulsive sound source for transportation of the source separate from the umbilical cable 2. The power cables 26 are properly shielded and extend down and through the fluid flow passage 24 to reach the motor cable connector 32 at the top of the motor 34 in module C. In a first embodiment, a combination time break pressure and temperature transducer 33 used to detect the firing of the source as well as monitor and transmit pressure and temperature is installed at the top of the fluid flow passage 24. Other sensors may be positioned throughout the source 1 to determine temperature and pressure as well as monitor and collect system operational parameters and other information. Module B also has openings 31 through the housing 16 to allow fluid communication from the flow passage 24 to the expansion chamber bladder 21. The flow passage 24 and expansion chamber 28 are filled with high temperature resistant hydraulic fluid to serve as a reservoir for the hydraulic pump 52 of module D of the source 1. The bladder 21 is secured to the housing 16 using band clamps 36 that surround the housing 16 and affix the bladder 21 at only the upper and lower portion of the housing 16 to allow for the middle of the bladder 21 to expand as pressure changes occur within the flow passage 24 and other modules of the source 1. A filler port 38 is provided to fill the flow passage 24. A vent 30 may be provided along the filler port passageway 29. A fluid passageway 40 is also provided at the base of module B to provide for communication of fluid between the flow passage 24 and the electric motor 34 of module C.

Figure 5:
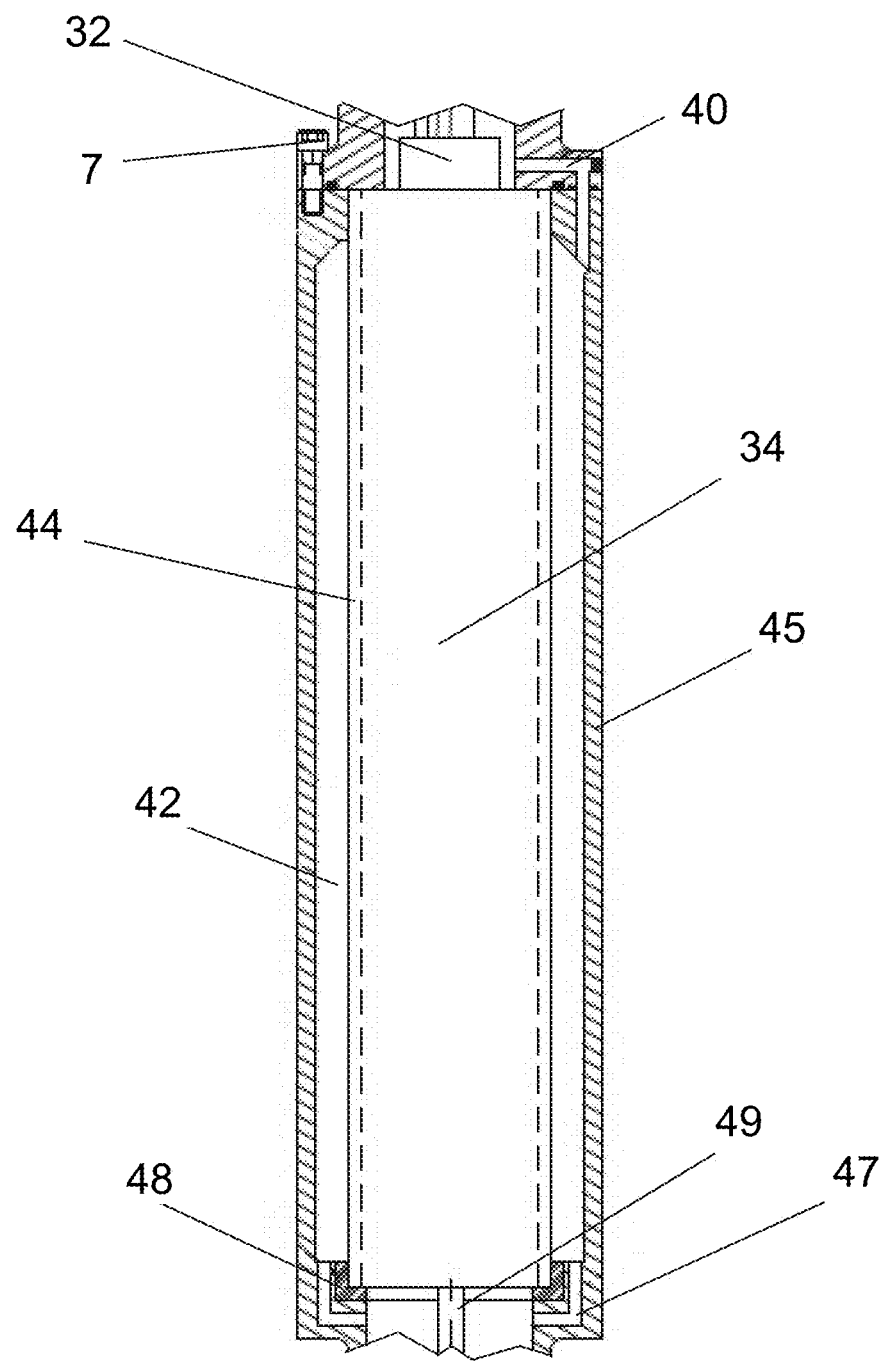
FIG. 5 is a cross sectional diagram of an embodiment of an electric motor of module C of the first embodiment of the impulsive sound source of the present invention.

A housing 44, as shown in FIG. 5, surrounds the electrical motor 34 and an annular fluid flow compartment 42 is formed between the housing 44 and the module C outer housing 45. The compartment 42 is filled with the system hydraulic fluid from the upper passageway 40 from module B to help maintain the motor 34 at acceptable operational temperatures. The upper passageway 40 also provides for fluid to flow from the compartment 42 back through to the expansion chamber flow passage 24 of module B as the source is fired and pressures change within the source. As temperature and pressure increase or decrease within the source and fluid moves through the hydraulic system, the expansion bladder 21 expands or contracts to prevent damage to components within the source due to fluid fluctuations. At the base of the enclosure 44 a flow passage 47 connects the reservoir of Module B to the manifold block 54 of module D and a rubber or other durable shock absorbing material cushion mount 48 is placed to help isolate the motor 34 from accelerations caused by the motions of the free piston 43. The motor 34 is a reversible three phase or DC motor capable of high temperature operation. The motor housing 44 and other structural components of the source 1 may be of stainless steel or other comparable materials that are capable of sustaining the load and pressures of the firing of the source 1 and bore hole environment. At the base of the motor 34, the shaft 49 of the electric motor 34 extends along axis X into module D to operate the hydraulic fluid pump 52. The shaft 49 is aligned through the manifold block 54 and is affixed to the hydraulic pump 52 using a flexible coupling 56 as shown in FIG. 6.

The manifold block 54 is in the upper portion of module D and contains two check valves 58 and two pressure relief valves 60 for supplying the bi-directional hydraulic pump 52 with hydraulic fluid and for setting the maximum pressure at which the hydraulic system may operate. The manifold block 54 has fluid by-pass passages 62 that connect the pump 52 to the pressure relief valves 60 and bores 64 that communicate with fluid by-pass tubes 66 for delivering hydraulic fluid to the reset piston assembly chambers 63 and 65 of module E. The by-pass tubes 66 extend from an upper portion 67 of the housing 68 of module D to a lower portion 69 that forms a shoulder for the tubing connection. O-rings 61 are rabbited into recesses within the upper and lower housing 68 and 69 and each end of the by-pass tubes 66 are installed. This design feature provides easy access to the tubing 66 for repair. The upper surface 70 of the lower housing portion 69 forms a seat for bolts 7 to be inserted through bolt holes that are evenly spaced around the cylindrical housing for attachment of module D to module E.

As the motor shaft 49 rotates in one direction, fluid is delivered to one by-pass passage 62 and one by-pass tube 66 and fluid is returned through the other by-pass tube 66 and by-pass passage 62 thereby simultaneously filling one and evacuating the other of the reset piston chambers 63 and 65 to extend or retract the reset piston assembly of module E. The check valves 58 direct fluid flow based on the rotational direction of the motor 34. The relief valves 60 provide for the release of fluid back to the reservoir of module B to prevent over pressuring the system as the reset piston assembly reaches a full point of extension and bottoms out in the receiving cup 130 of the free piston 110 or full retraction at an upper most point with the motor continuing to run in one direction until a peak in amperage triggers a relay switch (not shown) to change the direction of flow.

Figure 6:
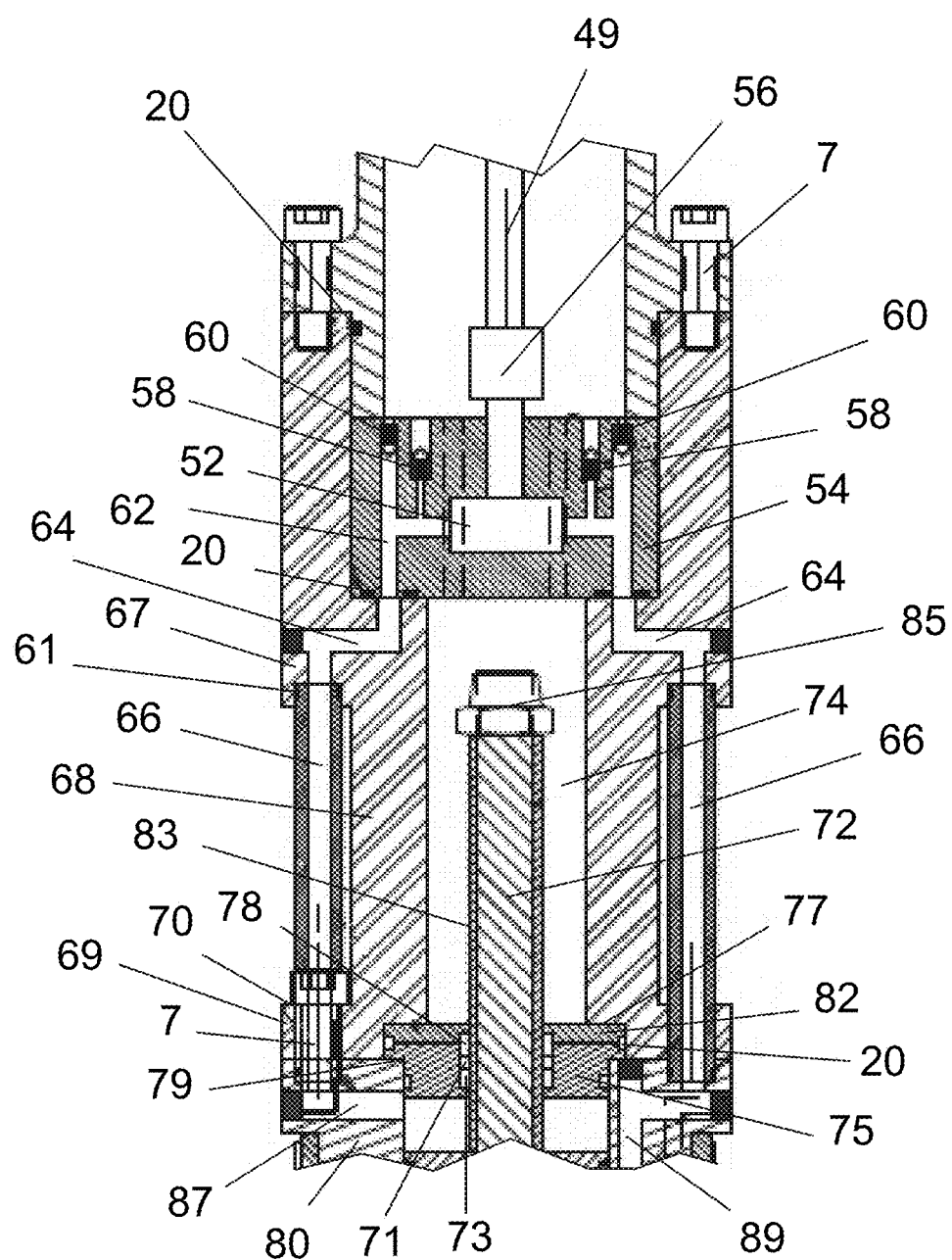
FIG. 6 is a cross sectional diagram of an embodiment of a hydraulic fluid pump of module D of the first embodiment of the impulsive sound source of the present invention.

As shown in FIG. 6, the rod 72 of the reset piston assembly extends into a cavity 74 formed by the housing 68 of module D. In order to slide smoothly a bearing and seal assembly is installed within bulkhead 75. The bearing and seal assembly includes a seal 71 a bearing 73 and a backup ring 78 positioned to protect the seal 71 from extrusion. To secure the bearing and seal assembly in place a retainer ring 82 is installed between a preformed edge 77 at the base of the housing 68 and a ledge formed at the upper surface 79 of the upper housing 80 of module E. The seal 71 prevents fluid leakage from chamber 63 into cavity 74 as chamber 63 is pressurized.

Figure 7A:
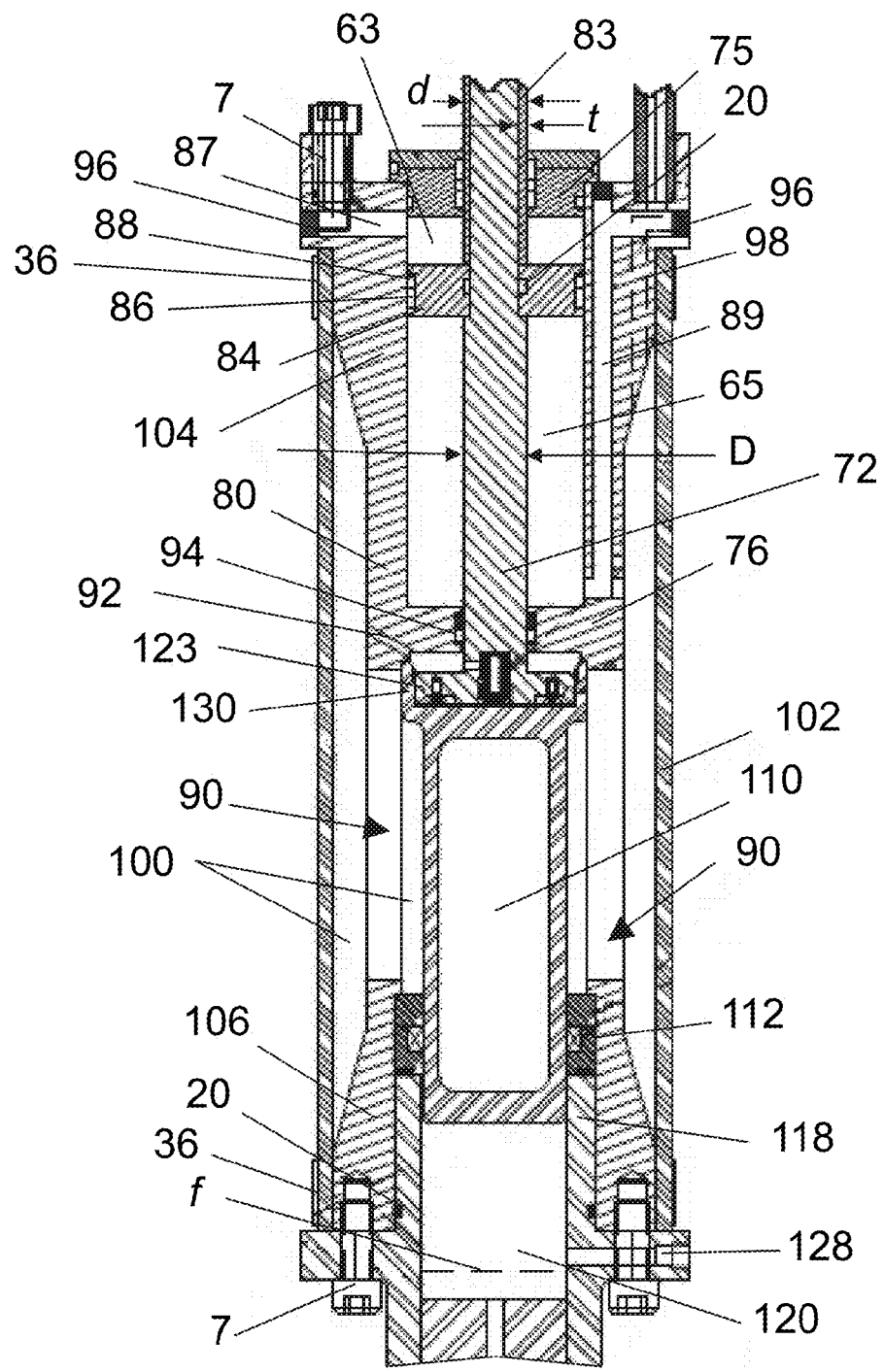
FIG. 7A is a cross sectional diagram of an embodiment of a reset piston assembly and high pressure free piston chamber of module E of the first embodiment of the impulsive sound source of the present invention in a ready to fire.

The reset piston 84 separates chambers 63 and 65 and is positioned along the piston rod 72 using a cylindrical sheath 83 and cap nut 85 that is tightened to hold the reset piston 84 in place along the rod 72. The sheath 83 is set at a thickness t that when combined with the upper rod diameter d is equal to the lower rod diameter D below the piston 84 in order to maintain an equal volume in the actuation chamber 63 and refraction chamber 65 above and below the piston 84. Hydraulic fluid from the hydraulic pump 52 is fed to and returned from the actuation chamber 63 through actuation feed bore 87. Hydraulic fluid is fed to and returned from the retraction chamber 65 through feed bore 89. A seal gland and ring bearing assembly 86 is affixed to the outer diameter of the reset piston 84 to seal and further assist in the reduction of friction as shown in FIG. 7A. The housing 80 of module E encloses the reset piston actuation chamber 63 and retraction chamber 65 with bulkhead 76 forming the base of the refraction chamber 65. The housing 80 is enclosed by an elastomeric bladder 102 forming the high pressure fluid implosion chamber 100 for the free piston 110. The free piston 110 may be hollow to reduce the weight of the free piston 110 and the overall weight of the source 1.

The bladder 102 is affixed to the housing at each end of the module using band clamps 36. The chamber 100 is sealed using a seal gland and ring bearing assembly 94 at bulkhead 76 that provides for reduced friction allowing the piston rod 72 to move smoothly between the reset piston chamber and implosion chamber. For the communication of fluid to and from the actuation and retraction feed lines 87 and 89 bores may be drilled through the housing and resealed with a brazed plug 96. A fluid fill plug 98 that is for example 90 degrees away from the actuation and retraction feed lines 87 and 89 is provided to fill the implosion chamber 100 with hydraulic fluid.

The housing 80 of the implosion chamber 100 may be tapered at either end to provide support structures for the attachment of bolts 7 to connect module D at the upper support structure 104 and to connect module F at the lower support structure 106 along the axis X. A seal gland ring bearing assembly 112 is installed at the lower support structure 106 to seal the implosion chambers and reduce friction to allow the free piston 110 to move smoothly within the impact chamber 120 of module F. The module F housing 118 surrounds the free piston 110 to form the impact chamber 120. Additional seals 20 are installed between the support bulkhead 118 and lower structural support 106 of housing 80 to prevent leakage. A fluid fill plug 128 as shown extends from the impact chamber perpendicularly to axis X and through the support bulkhead 118 to fill the impact chamber 120 to an appropriate fluid level denoted as fin FIG. 7A.

As shown in FIG. 7A, the piston rod 72 extends out and through the actuation and retraction chambers 63 and 65 and the chamber bulkhead 76. Attached to the end of the reset piston rod 72 is the reset piston latching seal assembly 123 that using a vacuum seal retains and draws the free piston 110 to a ready to fire position at an uppermost point within the implosion chamber 100. At the highest retraction point of the reset piston 84, the upper circular surface 151 of the receiving cup 130 strikes a shoulder 152 of the housing 80 that pulls the latching seal 146 out of the cup 130 breaking the vacuum seal and providing for high pressure fluid to flow past the latching seal 146 to rapidly accelerate the free piston through the chamber 100 to contact the anvil 160 within the impact chamber 120 transmitting the sound pulse as shown in FIG. 7B. A cross-sectional top view of the housing 80 showing the central portion of the implosion chamber 100 and the ports 90 that provide communication between the chamber 100 and the elastomeric bladder 102 is shown in FIG. 7C.

Figure 7D:
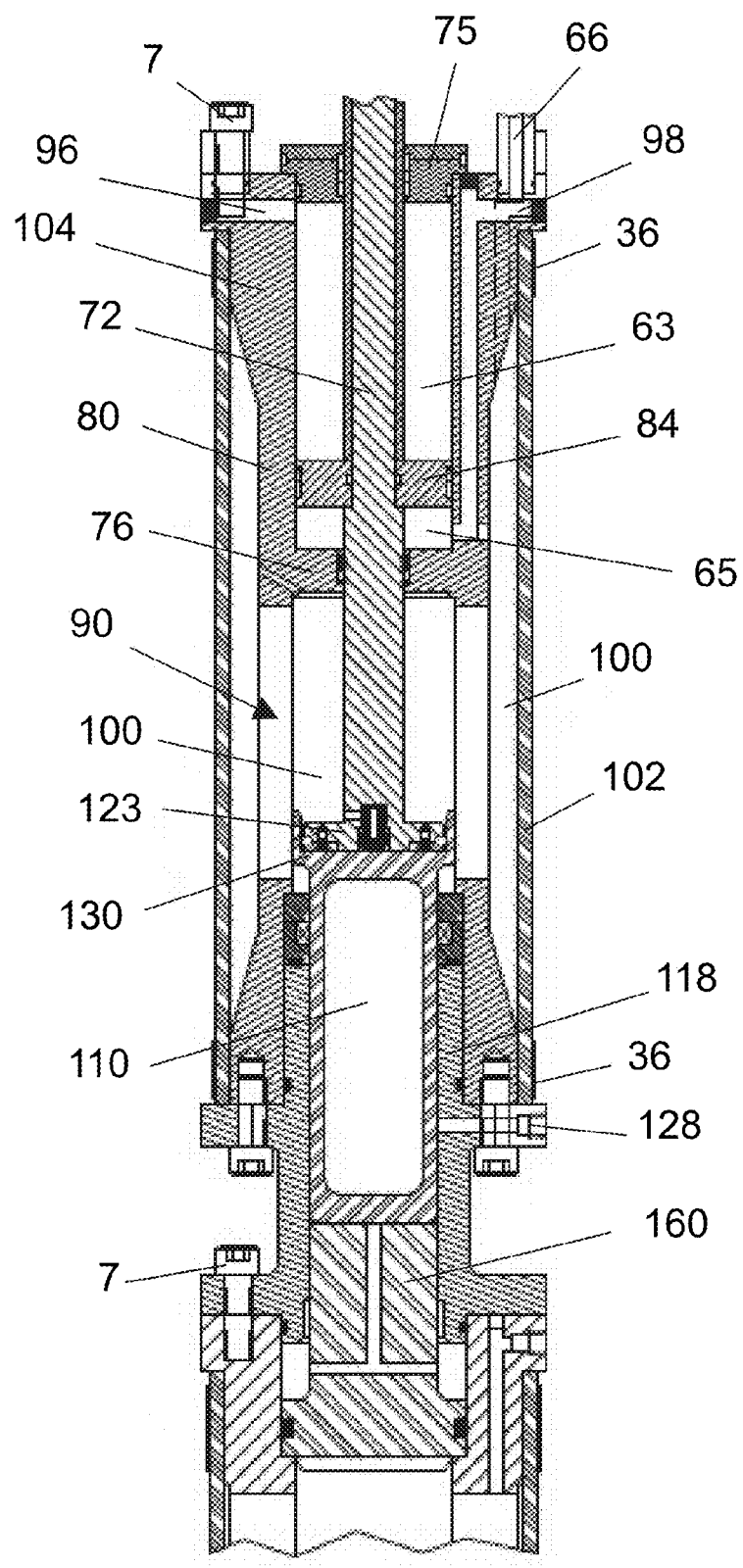
FIG. 7D is a top view cross section showing an embodiment of the communication ports in the implosion chamber of module E in a first embodiment of the impulsive sound source of the present invention.

The source 1 is prepared for firing by filling the actuation reset piston chamber 63 with pumped pressurized hydraulic fluid to force the reset piston 84 and the latching seal assembly 123 from the upper retraction position after firing down and into the receiver cup 130 of the free piston 110 at the base of the implosion chamber 100, as shown in FIG. 7D. The latching seal assembly 123 plugs into the receiver cup 130 formed in the upper portion at the top of the free piston 110, and is retained within the receiver cup 130 due to the evacuation of fluid that is trapped within the space between the bottom cylindrical surface 145 of the reset piston flange 138 that includes the reset piston latching seal assembly 123 and the upper cylindrical surface 148 of the cup 130. The fluid within this space is purged out through a passageway 132 forcing check valve 134 to open and release the evacuated fluid into the implosion chamber 100 through the check valve outlet 135. The evacuated space forms a vacuum to effectively lock the latching seal assembly flange 138 and free piston 110 together. Hydraulic fluid is then simultaneously removed from the actuation chamber 63 and fed to the retraction chamber 65 to draw the free piston 110 up to an uppermost retraction point in the implosion chamber 100.

Figure 7E:
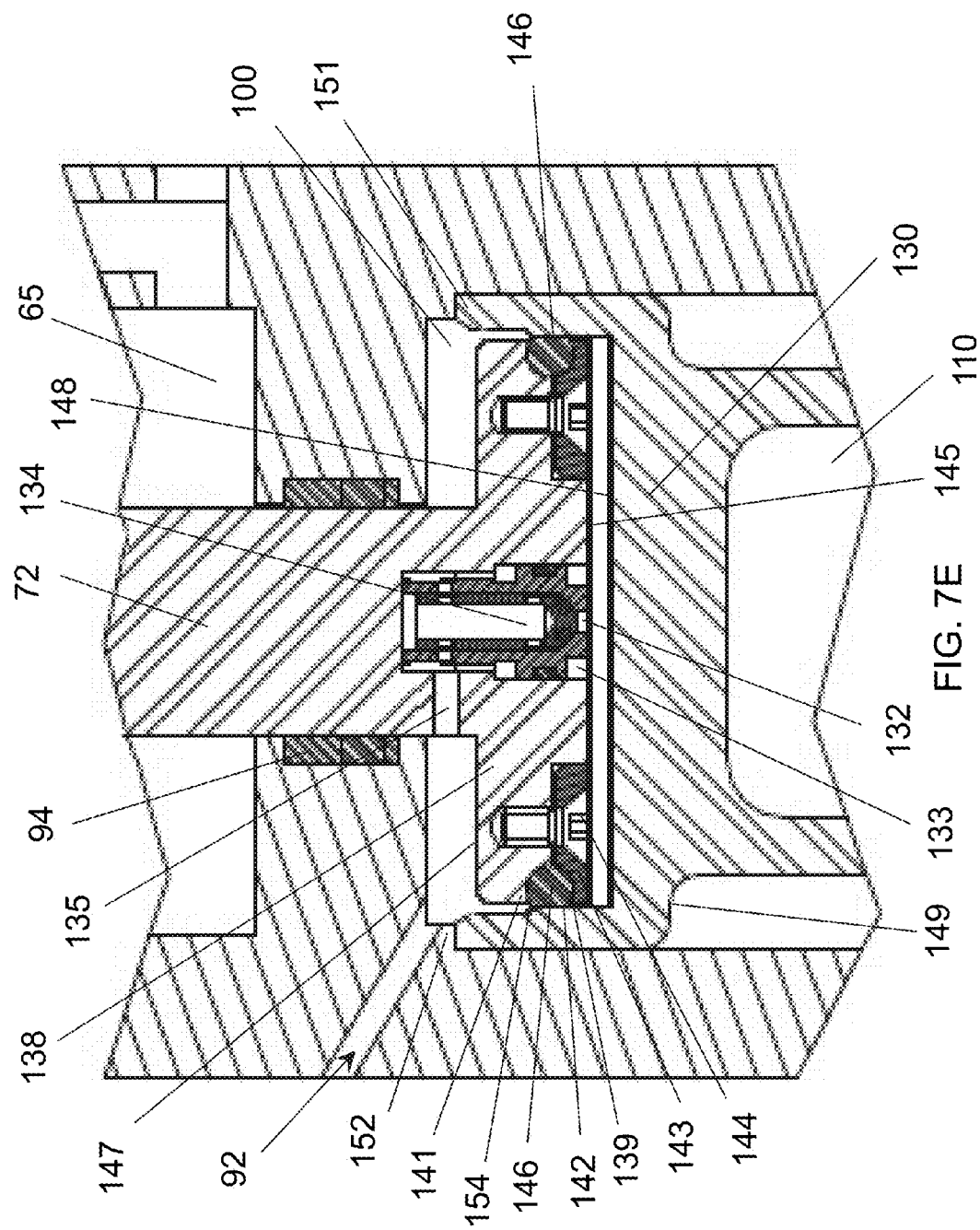
FIG. 7E is a cross sectional diagram of an embodiment of a latching seal flange of the reset piston assembly of module E of the first embodiment of the impulsive sound source of the present invention.

The latching seal assembly 123, as shown in FIG. 7E, has a high pressure latching seal ring 146 that surrounds the flange 138. The flange 138 has a diameter with a very close tolerance to and only slightly smaller than the diameter of the receiving cup 130 with the latching seal ring 146 seated within a groove formed around the outer diameter of the flange 138 and extending out beyond the edge 142 of the outer diameter of the flange 138. In a first embodiment, the latching seal 146 is retained within this groove in the flange a hooked sealing surface 141 and using a seal retainer ring 143 with flat head screws 144 that may be inserted through the base 145 of the flange 138 and be countersunk to maintain a smooth surface of the base 145 to mate with the smooth surface 148 of the receiving cup 130. Alternatively, the retaining ring 143 and screws 144 may be inserted through the upper surface 147 of the flange 138 to retain the latching seal 146. The retainer ring 143 may have a similar hooked surface 139 to retain the seal 146. Check valve 134 is mounted within the center and flush to the base 145 of the flange 138 by inserting a spanner wrench in slots 133 on either side of a central fluid passageway 132. The outlet port 135 of the check valve 134 communicates with the implosion chamber 100 and provides for fluid in the space between the base 145 of the reset piston assembly flange 138 and the inner cylindrical surface 148 of the receiving cup 130 to be evacuated through the passageway 132 and open check valve 134 to create the vacuum seal that retains and draws the free piston 110 into the ready to fire position. A pressure relief outlet 92 may be formed through the reset piston assembly housing 80.

As an example, if all or nearly all of the fluid has been purged out of the space between the bottom surface 145 of the piston flange 138 and the inner surface 148 of the free piston cup 130 through the check valve 134 and given that the sealing diameter at the inside diameter ID of the receiving cup 130 of the free piston 110 is 8.9 cm (3.5 inches) and the diameter of the portion of the reset piston assembly flange 138 within the receiving cup 130 is 7.6 cm (3.0 inches), the difference in effective cross sectional area at the annular rim 149 of the receiving cup 130 is 6.5 cm$^2$ (2.56 square inches). Therefore, if the fluid pressure within the implosion chamber 100 is 20.6 MPa (3000 psi) then as the reset piston assembly flange 138 moves upward compressing the fluid within the implosion chamber 100, the 6.5 cm$^2$ (2.56 square inch) difference in area produces a clamping force approaching 34.2 kN (7680 pounds of force) between the flat surfaces. This clamping force provides for the reset piston assembly to draw the free piston 100 to the full retraction point of the reset piston assembly. At the top of the retraction stroke of the reset piston 84, the upper edge 151 of the receiving cup 130 of the free piston 110 is stopped against the bottom side of a shoulder 152 formed in the implosion chamber housing 80 and the latching seal assembly flange 138 begins to pull out of the receiving cup 130. The expanded diameter of the latching seal 146 is pulled past a radius 154 formed in the vertical wall of the cup 130 releasing the vacuum and allowing fluid within the chamber 100 to flow past the latching seal 146 and fill the evacuated space between the upper and lower surfaces 145 and 148 accelerating the free piston 110 rapidly towards the impact chamber 120.

Figure 8:
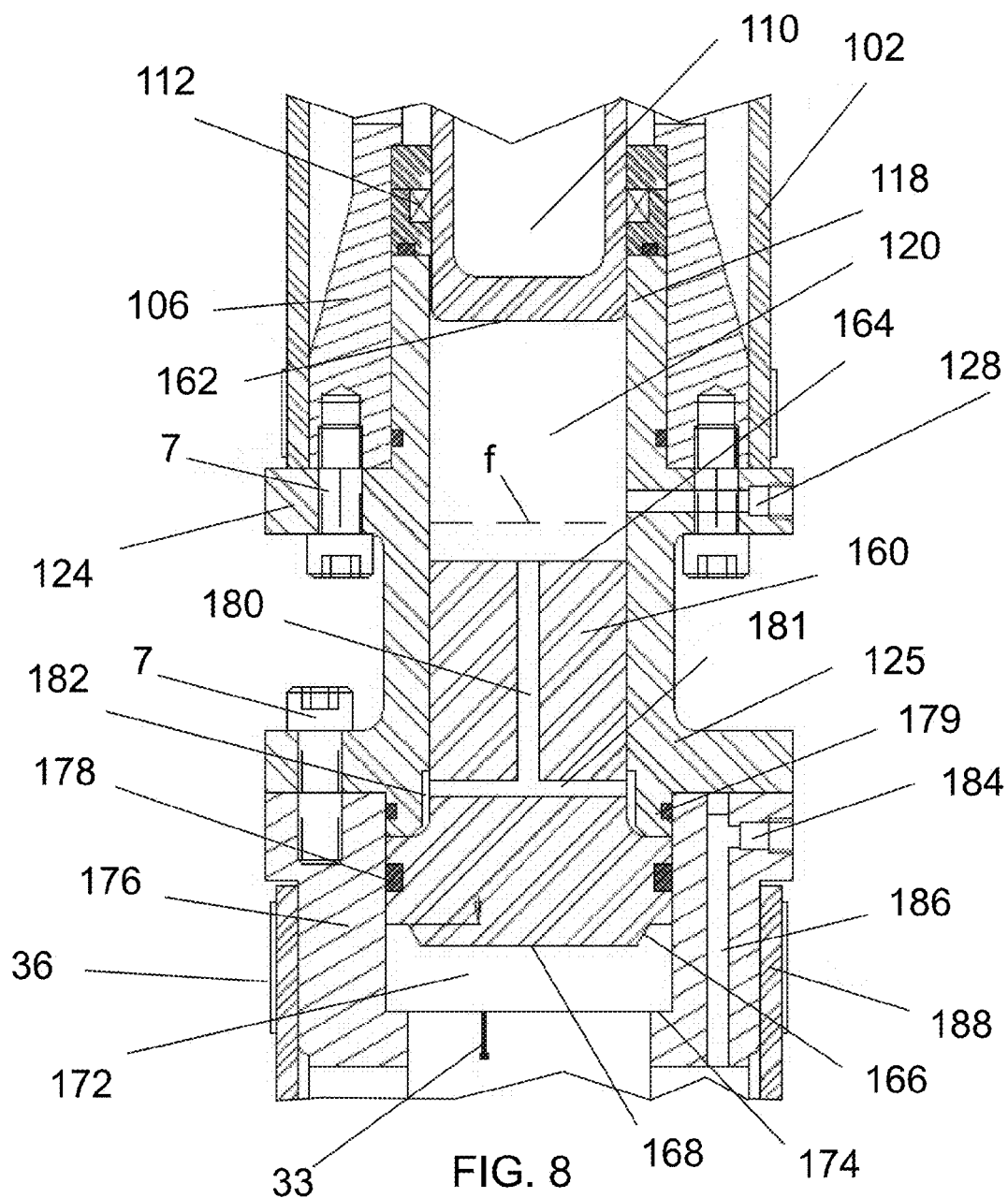
FIG. 8 is a cross sectional diagram of an embodiment of an impact chamber of module F of the first embodiment of the impulsive sound source of the present invention.

The impact chamber 120, as shown in FIG. 8, is partially filled with fluid to cushion the impact between the metal impact surface or face 162 of the free piston 110 and the anvil impact face 164. The compressibility and viscosity of the fluid within the impact chamber 120 and the shape of the impact surface 162 and anvil face 164 all contribute to the quality and characteristics of the sound produced by the impulsive sound source 1. Upon impact, the anvil piston 160 within the cylindrical support bulkhead 118 of module F and partially into an upper portion 172 of the sound transmission chamber 170 of module G. The support bulkhead 118 includes two bolting flanges 124 and 125 that extend laterally to provide bolt holes that are evenly spaced around the circular upper flange 124 attaching module E to module F and the circular lower flange 125 attaching module F to module G.

A dashpot nose 166 is formed at the cylindrical base 168 of the anvil piston 160. The cushion profile of the dashpot 166 is formed to act as a damper to absorb the remaining energy of the anvil 160 as it stops moving at the bottom of its impulse stroke. A seal and bearing assembly 178 is installed on the anvil piston 160 to reduce friction and a ring seal 179 is installed on the bulkhead 118 to prevent fluid flow between the impact chamber 120 and sound transmission chamber 170.

Figure 9:
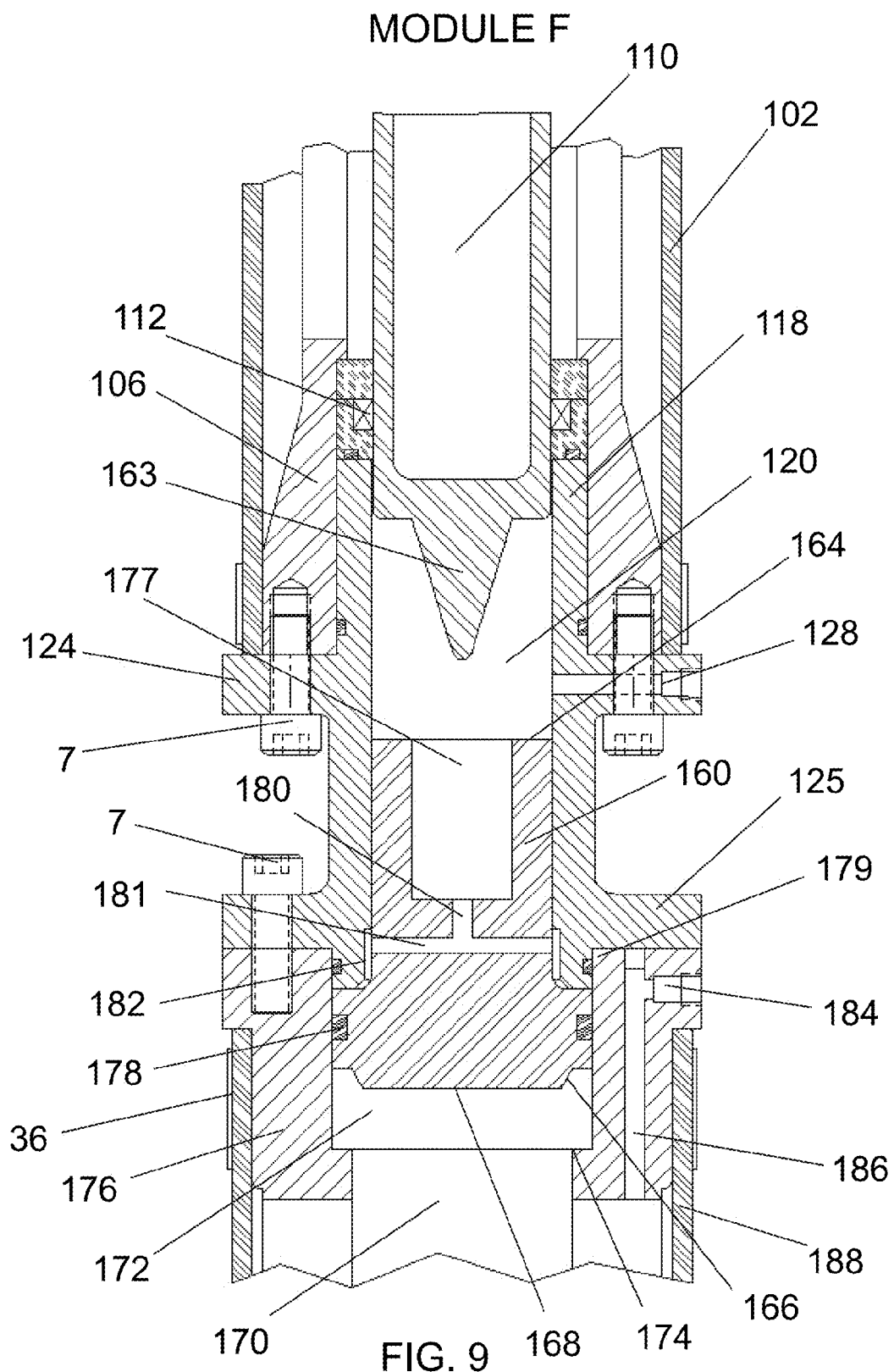
FIG. 9 is a cross sectional diagram is a further embodiment of the free piston and anvil of the impact chamber of module F of the first embodiment of the impulsive sound source of the present invention.

After firing, the impact chamber fluid is forced through a channel 180 formed through the anvil piston 160 and into a by-pass passageway 181 and into the space 182 within the impact chamber 120 created by the movement of the anvil piston 160 of module F. In drawing the free piston 110 up to the reset position for firing, fluid is drawn from the space 182 and up through the channel creating a vacuum and drawing the lower anvil piston 160 up and into the impact position for firing. The source 1 may be of any acceptable shape and dimension to accommodate the shape and dimensions of the bore hole being surveyed. As shown in FIG. 9, the free piston 110 may be shaped as a conical point 163 and the anvil may have a cylindrical opening 177 that would cause the frequency content to change as the conical point 163 enters the opening 177 producing a longer pulse with lower frequency content in the sound pulse. The free piston 110 and anvil may be formed in various shapes to produce a range of amplitudes and frequencies. Also by varying the weight and stroke of the free piston and/or anvil, the shape, intensity, and characteristics of the output pulse may be varied or tuned.

A fill valve 184 and passage 186 is provided for module G to fill and adjust the fluid within the sound transmission chamber 170. A bladder 188 is affixed to the upper portion and lower portion of the sound transmission housing 176 as shown in FIG. 10A using band clamps 36. Any number of ports 190 to transfer fluid from the sound transmission chamber 170 to the bladder 188 may be formed within the sound transmission chamber housing 176 with the number and dimensions dependent on the requirements of the geological survey. As noted, because of the modularity of the source 1, module G may be replaced with a sound transmission chamber having more or less than the four ports shown from the top view of the sound transmission chamber in FIG. 10B. A time break transducer or other sensors 33 may be installed in the sound transmission chamber 170 to detect the firing of the source or pressures and temperatures within the source 1. In a first embodiment, the end 194 of module G may be conically in shape to prevent the source from being held or damaged on ledges within the bore hole as the source is inserted and hung from the umbilical cable 2.

In operation, the source 1 in its ready to fire position is shown in FIG. 7A, in its fired position is shown in FIG. 7B and in its reset position is shown in FIG. 7D being picked up by the reset piston latching seal assembly 123. As the latching seal assembly flange 138 plugs into the receiving cup 130 at the top of the free piston 110, the latching seal 146 seals and slides within the bore of the cup 130. Fluid within the cup 130 escapes out through the check valve 134 forming a partial vacuum with the clamping force of the high pressure fluid within the implosion chamber 100 holding the reset piston latching seal assembly 123 and the interior surface 148 of the cup portion 130 together to draw the free piston 110 to the refraction point where the upper edge 151 of the free piston 110 is stopped against the shoulder 152 formed within the reset piston assembly housing 80. The latching seal assembly flange 138 is partially pulled from the cup 130, fluid enters past the radius 154 formed in the outer edge of the cup 130 and past the latching seal 146 to fill the evacuated space between the flat surfaces 145 and 148 of the latching seal assembly flange 138 and the free piston 110 releasing the vacuum and accelerating the free piston 110 down to impact upon the sound transmitting anvil piston 160 sending a sound pulse into chamber 170, through ports 190 to the bladder 188 and out through the ambient wall of fluid within the bore hole and into the surrounding geological structures.

Figures 11A, 11B:
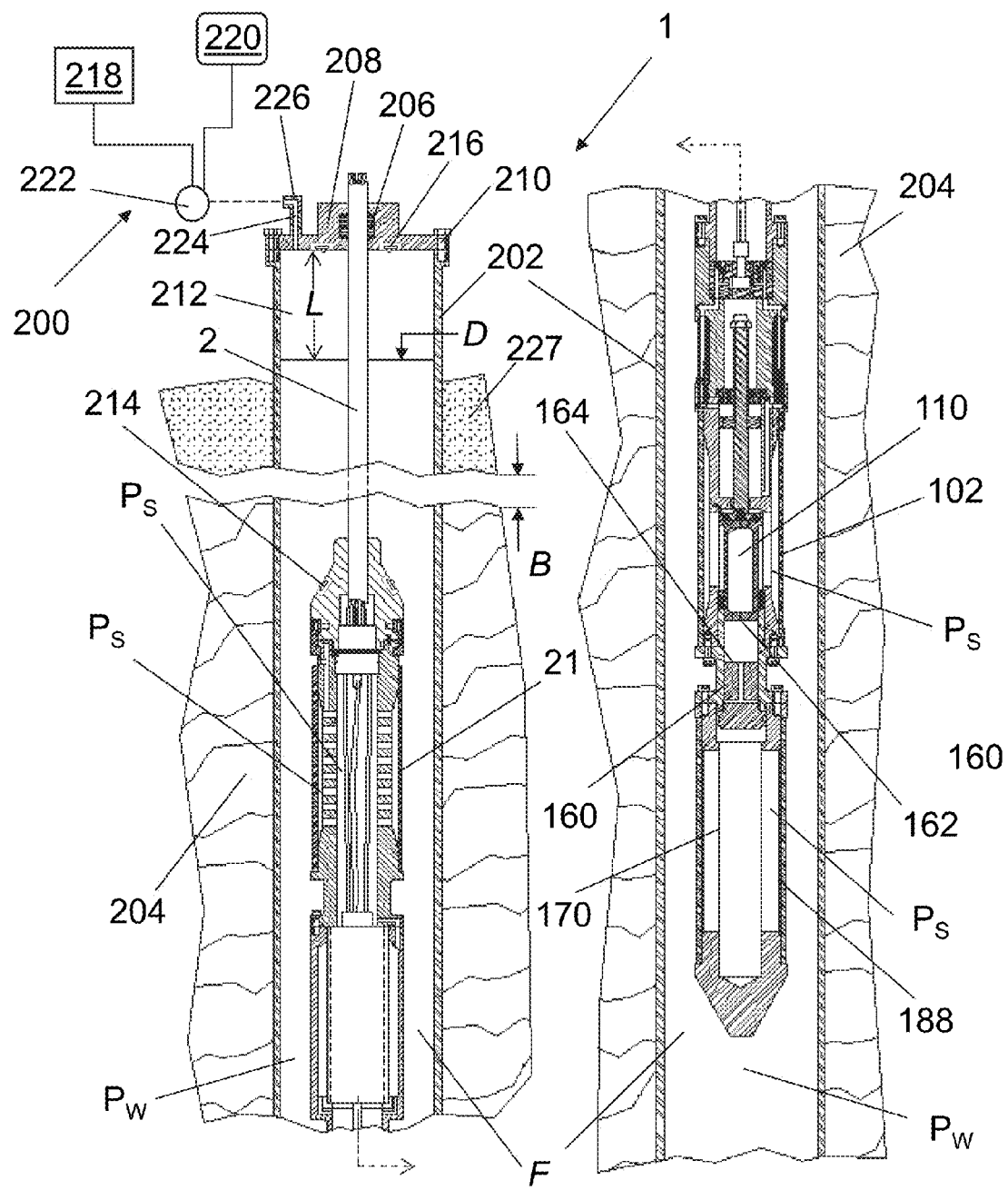
FIG. 11A is a cross-sectional diagram of an embodiment of a first portion of the impulsive sound source within a bore hole with an embodiment of a pressure regulating system of the present invention to adjust pressures within the bore hole in an embodiment of the present invention.
FIG. 11B is a continuation of the cross-sectional diagram of FIG. 11A of an embodiment of a second portion of the impulsive sound source within a bore hole in an embodiment of the present invention.

As the free piston 110 is accelerated when the impulsive sound source 1 fires the face 162 of free piston 110 impacts upon the face 164 of the movable anvil piston 160 and thereby causing the anvil piston 160 to rapidly accelerate downwardly creating the impulse which in turn rapidly expands elastomeric bladder 188 of the sound transmission chamber 170 creating a sound pulse within the well fluid F which propagates through the well casing 202 into the earth strata 204 as a seismic sound pulse within the earth, as shown in FIGS. 11A and 11B. Because the elastomeric bladder 21 of the expansion chamber of Module B, the elastomeric bladder 102 surrounding the free piston chamber of Module E, and the elastomeric bladder 188 of the sound transmission chamber 170 of Module G are all tubular and flexible bladders the pressure of the fluid within these chambers denoted as Ps stands equal to the pressure within the well casing denoted as Pw.

When the impulse type of down-hole sound source 1 of the present invention is suspended by the umbilical cable 2 there is a pressure seal gland 206 which seals the pressure within the well around the umbilical cable 2 within a pressure retaining well cap assembly 208 held in place and sealed at the top of the well casing 202 by bolt circle 210. The bore hole 212 and well casing 202 may be either a shallow bore such as a few hundred feet or a deep bore such as 10,000 feet and the bore may be fully liquid filled or only partially filled with fluid. The intensity of the impulse the sound source 1 produces when fired is proportional to the static pressure within the bore hole 212 where the sound source 1 is located thus when the sound source 1 is immersed at a shallow depth in the well or bore hole 212 the intensity of the seismic data is lower than when immersed deeply within the bore hole fluid F such as when submerged in water, oil, or in drilling mud.

When the sound source 1 within a bore hole 212 is used for seismic profiling, the sound source 1 may be raised and lowered within the well between shots from the sound source 1. As the sound source 1 is raised or lowered in the bore hole 212, the pressure within the well Pw changes depending on the location and depth of the sound source 1. For acceptable quality in the records of the seismic survey, it is important that the intensity and character of the sound pulse remains constant as the sound source 1 is raised and lowered to a location and fired. Any changes in pressure within the well Pw during the collection of seismic data may affect the intensity and character of the sound pulse, thus the present invention provides for pressure within the well Pw to be adjusted as the impulsive sound source 1 is moved within the well casing 202 or bore hole 212.

For example, commonly in completing a seismic survey, the sound source 1 is lowered to a lowest point in the bore hole 212 and fired and is then raised to another depth and fired and this is repeated as the sound source 1 is pulled up through the bore hole 212. One of more pressure sensors 214 on the sound source 1 as well as pressure sensors 216 at the well cap assembly 208 transmit pressure readings to a controller 218. From these readings the pressure may be manually or automatically increased as the sound source 1 is moved within the bore hole 212 to keep the current pressure the same as the initial pressure readings that were recorded when the survey started at, in this example, the lowest point in the bore hole 212. A fluid pressure source 220, the controller 218, a pressure regulator 222 and using hose or pipe 224 connected through the well cap assembly 208 may supply either high pressure gas, water or other fluid through an input fitting 226 to adjust the pressure within the bore hole 212. The bore hole 212 may be filled with fluid nearly to the top of the bore hole 212 with a cushion or space of pressurized gas of a short length L such as 10 feet more or less from the pressure retaining well cap assembly 208 to the well fluid level D with the well fluid level D ending above ground level. The impulsive sound source 1 and pressure regulating system 200 may also be used with the fluid F within the bore hole 212 completely filling the bore. The well cap assembly 208 containing the umbilical cable sliding seal 206 and the fluid input fitting 226 and bolt circle 210 is illustrative of where a conventional well head device such as that which is called a lubricator may be used within actual use of the pressure regulating system 200 of the present invention.

The top layer of earth 227 called overburden and the rock formations 204 beneath the overburden 227 are illustrated. A break B in the length of the well casing 202 and bore hole 212 which may be for instance from about one hundred feet to thousands of feet is also shown. The sound source 1 is operational at any depth within the bore hole 212. However, if a bore hole 212 is too shallow to supply enough hydrostatic pressure for the impulsive sound source 1 to produce an adequate sound pulse, the bore hole 212 may be pressurized to different levels of pressures until a pressure level is reached which provides sound pulses from the sound source 1 with enough intensity and sound characteristics to obtain acceptable high quality seismic records. The pressure regulating system 200 of the present invention may further provide automated adjustments to the pressures to maintain an initial pressure that is recorded at the initial depth of the seismic survey and using a computer processor of the controller adjust pressures to the initial pressure or a desired pressure based on the current pressure readings and/or intensity and characteristics of the seismic data acquired from the impulsive sound source 1 at a location and depth within the bore hole 212.

The invention has been described in detail with particular reference to certain preferred embodiments thereof, but it will be understood that variations and modifications can be effected within the spirit and scope of the invention.

What is claimed is:

1. A method of obtaining seismic records using an impulsive sound source within a bore hole comprising the steps of:
    adjusting pressures surrounding an impulsive sound source within a bore hole to change the intensity and character of a sound pulse produced by the impulsive source;
    firing the impulsive sound source at an adjusted pressure surrounding the impulsive sound source; and
    acquiring seismic records.

2. The method of obtaining seismic records using an impulsive sound source within a bore hole of claim 1, further comprising the steps of:
    measuring pressure readings within the bore hole at a first depth to obtain an initial pressure;
    moving the impulsive sound source to a new depth within the bore hole;
    measuring pressure readings within the bore hole at the new depth;
    adjusting pressure within the bore hole to the initial pressure.

3. The method of obtaining seismic records using an impulsive sound source within a bore hole of claim 1, further comprising the steps of:
    moving the impulsive sound source to a new depth within the bore hole;
    measuring pressure readings within the bore hole at the new depth;
    adjusting pressure within the bore hole to a desired pressure.

4. The method of obtaining seismic records using an impulsive sound source within a bore hole of claim 1, further comprising the steps of determining the intensity and characteristics of the seismic records.

5. The method of obtaining seismic records using an impulsive sound source within a bore hole of claim 1, further comprising the steps of adjusting the pressure within the bore hole based on the determined intensity and characteristics of the seismic records.

6. The method of obtaining seismic records using an impulsive sound source within a bore hole of claim 1, further comprising the steps of:
moving the impulsive sound source to another depth within the bore hole;
measuring pressure readings within the bore hole;
firing the impulsive sound source within the bore hole;
determining the intensity and character of the seismic records;
adjusting the pressure within the bore hole based on pressure readings and the intensity and characteristics of the seismic records.

7. The method of obtaining seismic records using an impulsive sound source within a bore hole of claim 1, comprising the steps of:
simultaneously moving the impulsive sound source while firing the impulsive sound source within the bore hole while measuring pressure readings within the bore hole while determining the intensity and characteristics of the seismic records; and
adjusting the pressure within the bore hole based on the pressure readings and the intensity and characteristics of the seismic records.

8. The method of obtaining seismic records using an impulsive sound source within a bore hole of claim 1, comprising the steps of artificially pressurizing the bore hole to obtain enough pressure to operate the impulsive sound source to sufficient sound output levels to obtain consistent quality seismic records.

9. The method of obtaining seismic records using an impulsive sound source within a bore hole of claim 1, wherein the pressure levels within the bore hole are adjusted while the sound source is moving within the bore hole in order to keep the pressure within the bore hole at a desired level.

10. A system for adjusting and maintaining pressure within a bore hole in order to obtain acceptable quality seismic records using an impulsive sound source comprising:
an impulsive sound source having at least one pressure sensor and having a free piston accelerated by hydrostatic pressure to strike a movable anvil and transmit a sound pulse through a bore hole to obtain seismic records and having a reset piston having a latching seal to latch the reset piston and free piston to retract the free piston for firing;
a pressure source; and
wherein the pressure source adjusts the pressure within the bore hole to change the intensity and character of a sound pulse produced by the impulsive source based on initial and current pressure readings from the at least one pressure sensor.

11. The system for adjusting and maintaining pressure within a bore hole in order to obtain acceptable quality seismic records using an impulsive sound source of claim 10, wherein an initial pressure is a pressure reading taken at an initial depth at the beginning of a seismic survey and current pressure readings are pressure readings taken during the seismic survey.

12. The system for adjusting and maintaining pressure within a bore hole in order to obtain acceptable quality seismic records using an impulsive sound source of claim 10, further comprising a computer processor for determining the intensity and characteristics of the seismic records from the firing of the impulsive source.

13. The system for adjusting and maintaining pressure within a bore hole in order to obtain acceptable quality seismic records using an impulsive sound source of claim 12, wherein the adjustment of pressure within the bore hole is based on a determined intensity and characteristics of the seismic records.

14. The system for adjusting and maintaining pressure within a bore hole in order to obtain acceptable quality seismic records using an impulsive sound source of claim 11, wherein the impulsive sound source is moved to a new depth within the bore hole and the pressure source adjusts the pressure within the bore hole to the initial pressure at the new depth.

15. The system for adjusting and maintaining pressure within a bore hole in order to obtain acceptable quality seismic records using an impulsive sound source of claim 10, wherein the impulsive sound source is moved to a new depth within the bore hole and the pressure source adjusts the pressure within the bore hole to a desired pressure at the new depth.

16. The system for adjusting and maintaining pressure within a bore hole in order to obtain acceptable quality seismic records using an impulsive sound source of claim 12, wherein in using the computer processor, the pressure source adjusts the pressure within the bore hole at the current depth of the impulsive sound source simultaneously while the impulsive sound source is moving and firing based on one of at least the initial and current pressure readings and the intensity and characteristics of the seismic records.

* * * * *